United States Patent
Daultani

(10) Patent No.: US 10,922,061 B2
(45) Date of Patent: Feb. 16, 2021

(54) INFORMATION PROCESSING APPARATUS, INFORMATION PROCESSING METHOD AND STORAGE MEDIUM STORING PROGRAM RELATED TO INSTRUCTION SELECTION OF A COMPILER

(71) Applicant: NEC Corporation, Tokyo (JP)

(72) Inventor: Vijay Daultani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 269 days.

(21) Appl. No.: 16/305,130

(22) PCT Filed: Jun. 2, 2016

(86) PCT No.: PCT/JP2016/002686
§ 371 (c)(1),
(2) Date: Nov. 28, 2018

(87) PCT Pub. No.: WO2017/208283
PCT Pub. Date: Dec. 7, 2017

(65) Prior Publication Data
US 2020/0326917 A1    Oct. 15, 2020

(51) Int. Cl.
*G06F 9/30*    (2018.01)
*G06F 9/455*    (2018.01)
(Continued)

(52) U.S. Cl.
CPC .................... *G06F 8/443* (2013.01)

(58) Field of Classification Search
CPC ..... G06F 8/51; G06F 8/52; G06F 8/41; G06F 8/436; G06F 8/427; G06F 8/30;
(Continued)

(56) References Cited

U.S. PATENT DOCUMENTS 7,330,962 B2    2/2008 Ludwig et al.
9,658,851 B2 *  5/2017 Keramidas ............ G06F 9/3004
(Continued)

FOREIGN PATENT DOCUMENTS

JP    S62-204374 A    9/1987
JP    2000-259423 A   9/2000
JP    2001-166947 A   6/2001

OTHER PUBLICATIONS

Zeng et al., An efficient hybrid synchronization technique for scalable multi-core instruction set simulations, 6 pages (Year: 2013).*

(Continued)

*Primary Examiner* — Thuy Dao

(57) ABSTRACT

An information processing apparatus according to one of exemplary aspects of the present disclosure includes: an alternate pattern identifier 862 that identifies first instruction sequences in a program in a first language, each of the first instruction sequences leading to a result individually achieved by second instruction sequences in a second language different from the first language, the second instruction sequences including operators being common to the first instruction sequences; a pattern selector 865 that determines ratios for the operators of the second instruction sequences; and an instruction scheduler 870 that selects a second instruction sequence based on the ratios from the second instruction sequences for each of the first instruction sequences.

10 Claims, 16 Drawing Sheets

(51) Int. Cl.
*G06F 9/44* (2018.01)
*G06F 8/41* (2018.01)
*G06F 12/08* (2016.01)
*G06F 9/38* (2018.01)

(58) Field of Classification Search
CPC ........ G06F 8/456; G06F 8/47; G06F 11/3006;
G06F 9/45516; G06F 9/30174; G06F
9/45504; G06F 12/0875; G06F 2212/452;
G06F 8/443; G06Q 10/06
See application file for complete search history.

(56) References Cited

U.S. PATENT DOCUMENTS

| | | | |
|---|---|---|---|
| 10,180,850 B1 * | 1/2019 | Kasat | ................. G06F 8/443 |
| 2001/0039654 A1 | 11/2001 | Miyamoto | |

OTHER PUBLICATIONS

Japanese Office Action for JP Application No. 2018-560238 dated Oct. 1, 2019 with English Translation.
Cifuentes et al., "The Design of a Resourceable and Retargetable Binary Translator", Reverse Engineering, 1999. Proceedings. Sixth Working Conference on Atlanta, GA, USA Oct. 6-8, 1999, Los Alamitos, CA, USA, IEEE Comput. Soc, US, Oct. 6, 1999 (Oct. 6, 1999), pp. 280-291, XP010360118,DOI: 10.1109/WCRE.1999. 806967ISBN: 978-0-7695-0303-5 (total 12 pages).
International Search Report with Written Opinion dated Nov. 10, 2016, issued by the International Searching Authority in application No. PCT/JP2016/002686.

* cited by examiner

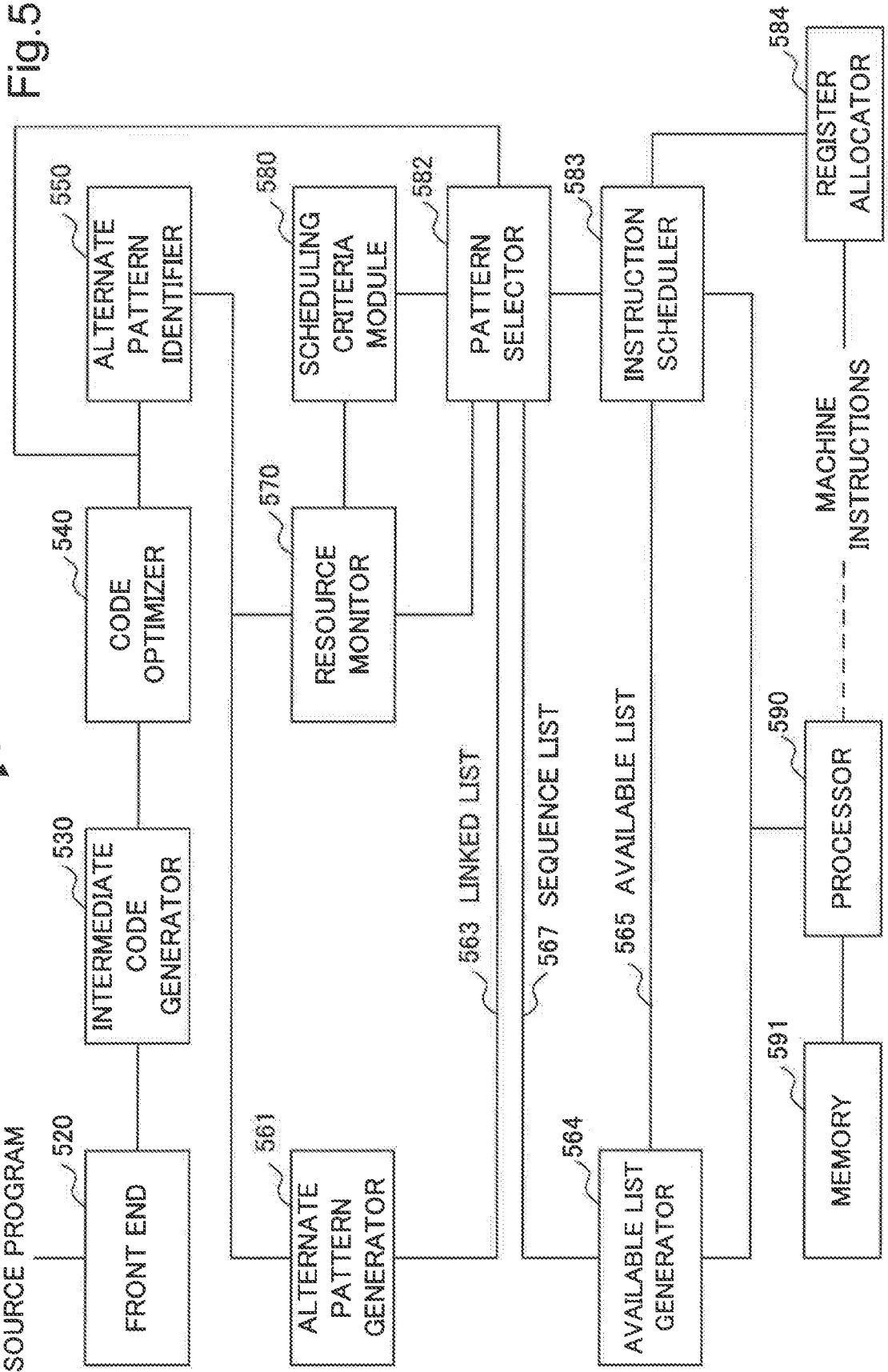

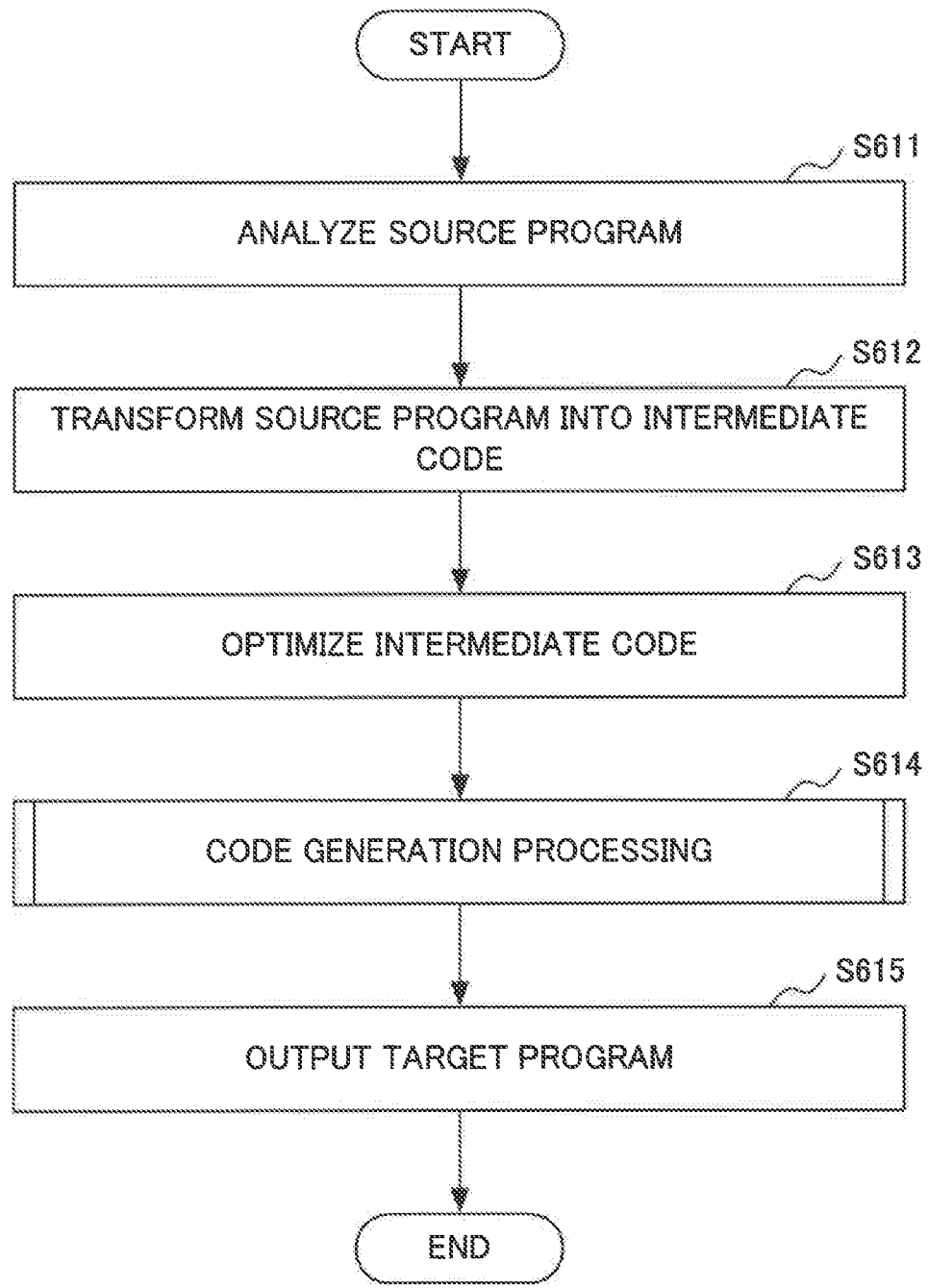

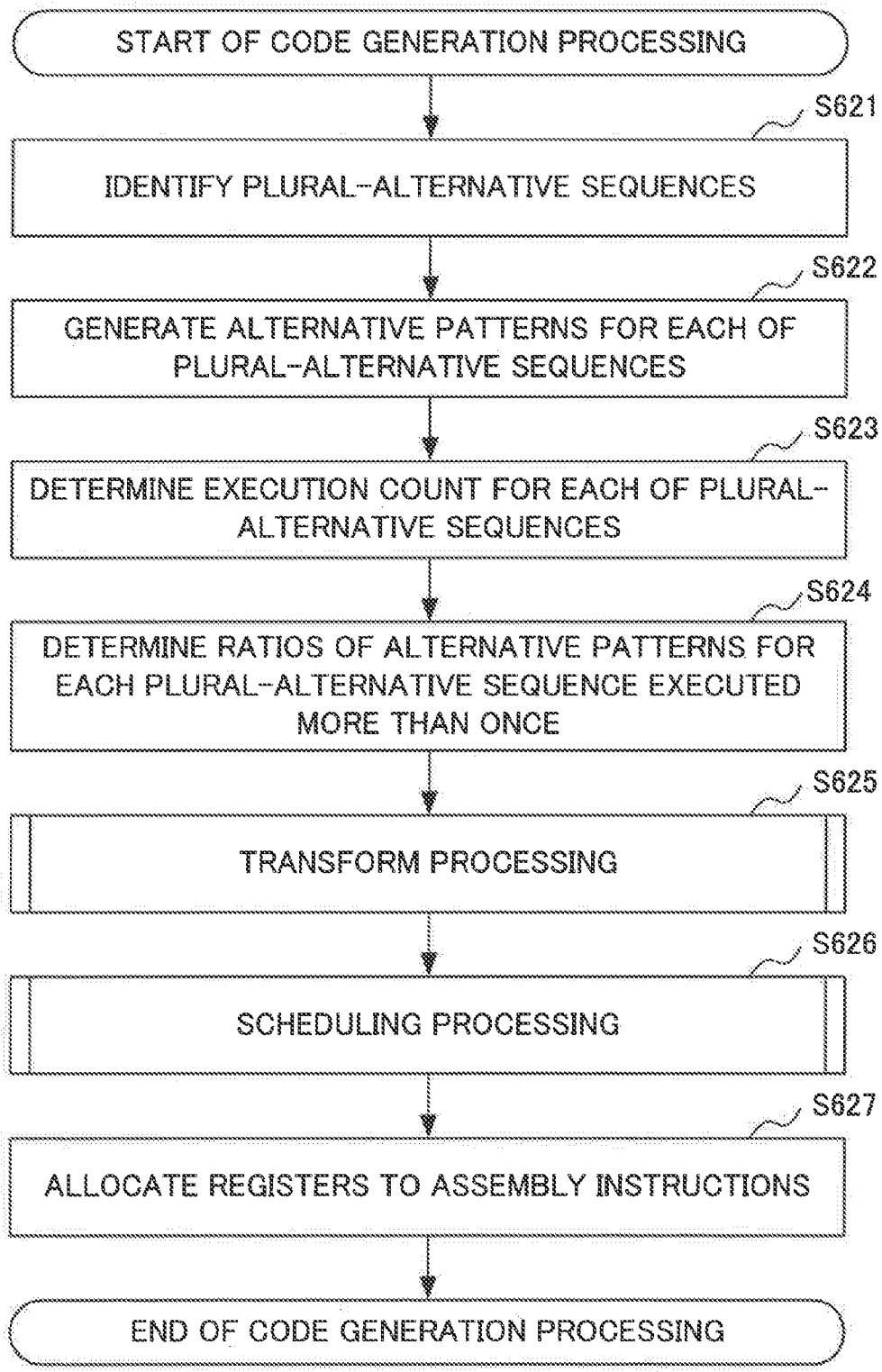

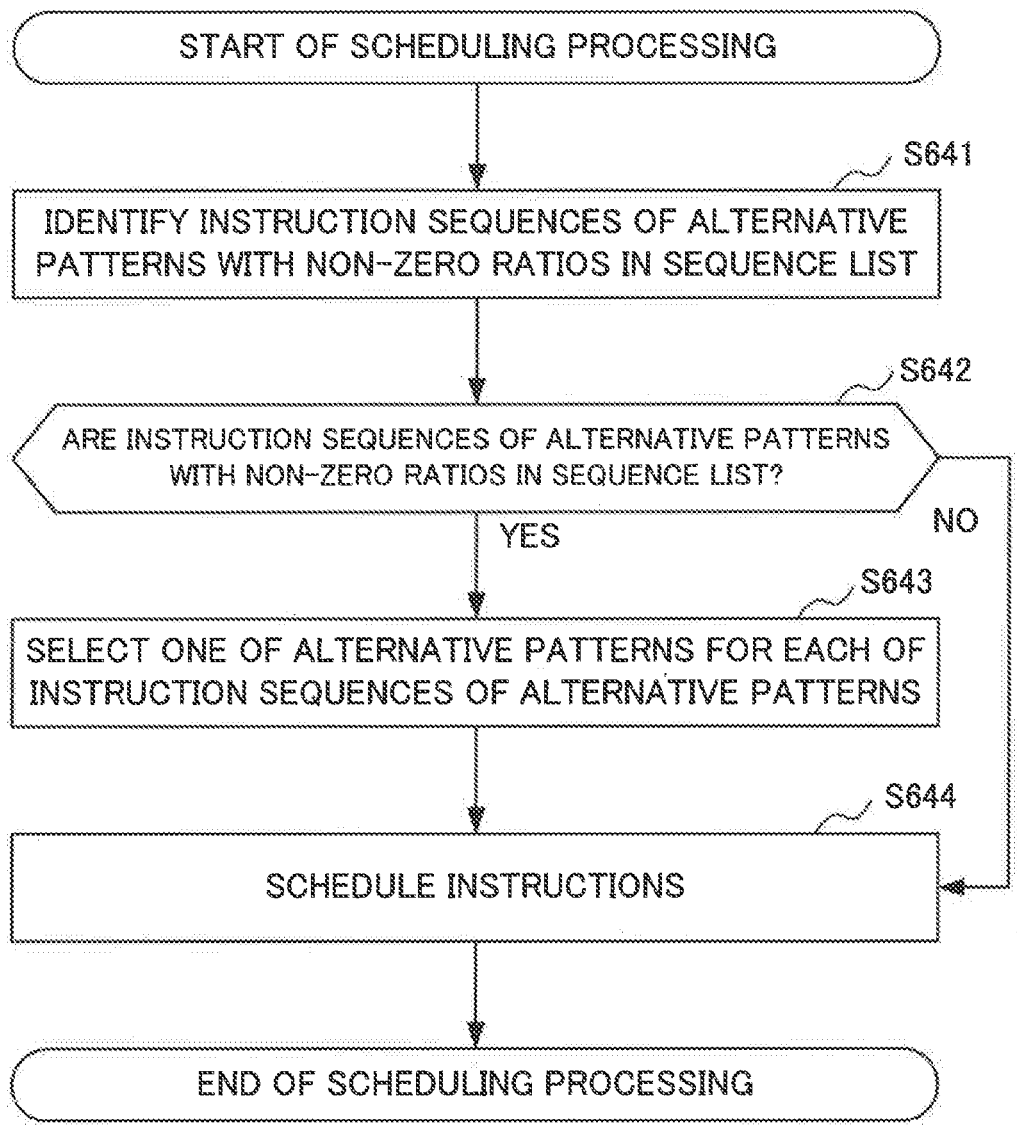

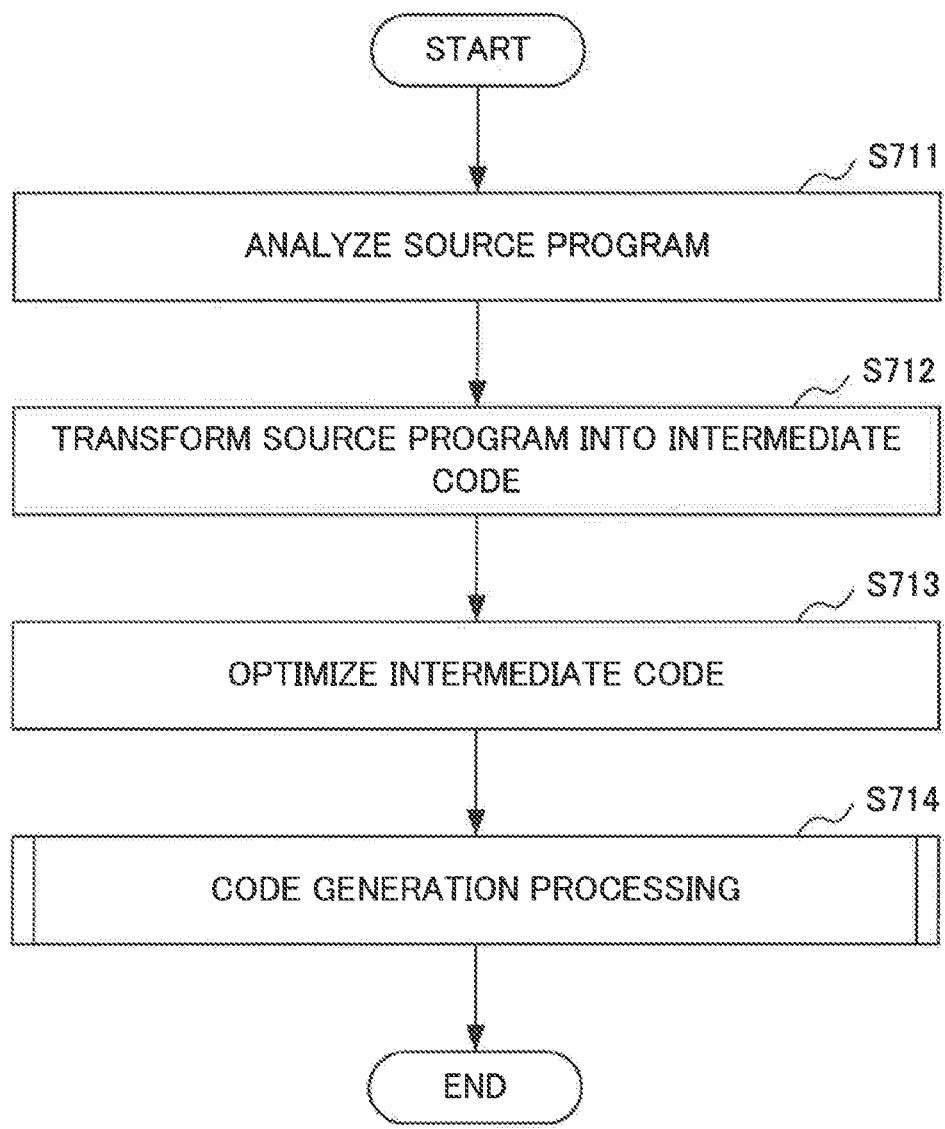

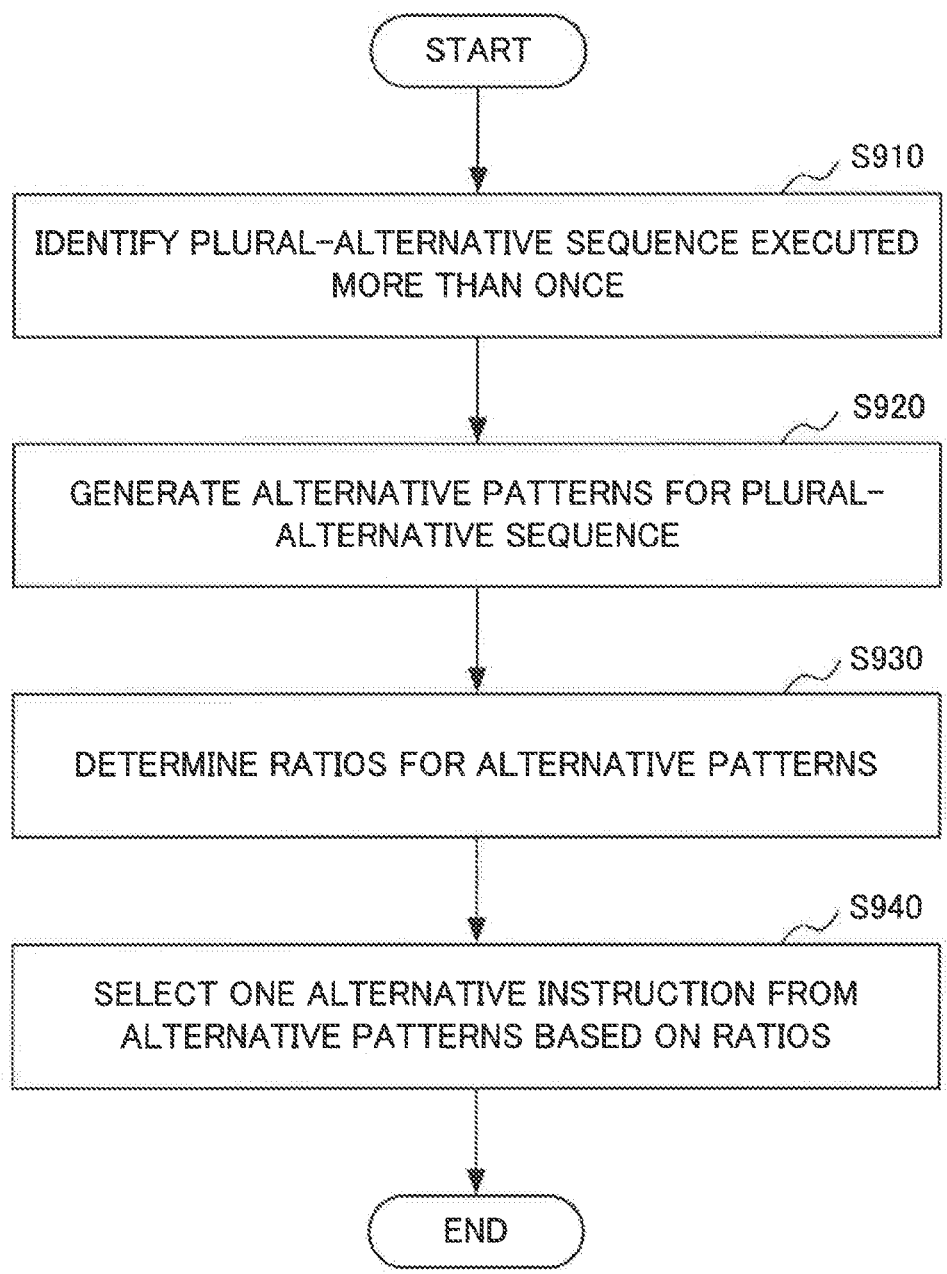

INFORMATION PROCESSING APPARATUS, INFORMATION PROCESSING METHOD AND STORAGE MEDIUM STORING PROGRAM RELATED TO INSTRUCTION SELECTION OF A COMPILER

This application is a National Stage Entry of PCT/JP2016/002686 filed on Jun. 2, 2016, the contents of all of which are incorporated herein by reference, in their entirety.

TECHNICAL FIELD

The present disclosure relates to field of information processing. In particular the present disclosure relates to instruction selection of a compiler.

BACKGROUND ART

Developing application program (hereinafter, referred to also as "application") in a language which is close to hardware, for example, an assembly language, has certain limitations like being difficult, error-prone and time consuming. And therefore high-level languages were introduced to keep actual application independent of hardware architecture for execution of the application program. To fill the gap between the high-level languages and the low-level language, such as, the assembly language and a machine language, translation was introduced to compilers, and the compilers translate the high level languages in which application program is written into a low level language. A program generated by translation into the low-level language is then loaded into a memory and then executed by a processor.

A compiler is a program or a set of programs that transforms source program written in a source language (i.e. one of the high-level languages) into a target program in a target language (e.g. the low-level language) which a computer can understand. Working of compilers is broadly divided into three phases, i.e. a front end phase, a code optimizer phase and a back end phase. The front end phase is further divided into three sub phases i.e. a lexical analysis phase, a syntax analysis phase, and a semantic analysis phase. Input of the front end phase is the source program and output of the front end phase is intermediate code, which is also referred to as "intermediate representation". Techniques used in the code optimizer phase include several different techniques both machine-specific and not machine-specific to optimize the intermediate code given from the front end phase as input to the code optimizer phase. The back end phase also known as a code generation phase can be divided into three sub phases, i.e. an instruction selection phase, an instruction scheduling phase and a register allocation phase. Usually input source code is processed in all the phases sequentially, therefore output of the first phase is input to the second phase, and output of the second phase is input to the third phase and so on. Accordingly output of the code optimization phase is given as input to the code generation phase.

The intermediate code includes an intermediate representation (hereinafter, referred to also as "IR") that is not much similar to a source program written in a programming language (i.e. one of the high-level languages) and may be a series of intermediate instructions i.e. instructions independent of machine architecture. The code in the low-level language (i.e. assembly code) includes a series of low-level instructions i.e. assembly (or machine) instructions depending on machine architecture.

The code generator performs translating the IR into an assembly instruction set (i.e. one or more assembly instructions) of the target architecture. In other words, the code generator performs mapping the IR on the assembly instruction set. To perform such mapping, the code generator determines assembly (or machine) instructions from an instruction set architecture (ISA) to be used to implement the IR. The assembly instructions are determined (i.e. selected) by an instruction selector that is a module performing processing of the instruction selector phase. It is necessary to determine order of the selected assembly instructions in the assembly code. The order of the selected instructions is determined (i.e. the selected assembly instructions are scheduled) by an instruction scheduler that is a module performing processing of the instruction scheduler phase. After the selected assembly instructions are scheduled, it is necessary to allocate hardware registers to each of the assembly instruction. The hardware registers are allocated individually to the assembly instructions in the register allocator phase.

The compiler performing the instruction selection maps one or more intermediate instruction sequences included in the input IR onto one optimal assembly instruction sequence. An intermediate instruction sequence in the intermediate instruction sequences may be a series (i.e. one or more) of intermediate instructions. The intermediate instruction sequence may be an intermediate instruction. An assembly instruction sequence may be a series (i.e. one or more) of assembly instructions. The assembly instruction sequence may be an assembly instruction. Each of the intermediate instructions may be mapped to one or more assembly instructions. Such mapping is performed with the help of some variation of template or pattern matching. Since a single arithmetic or logical operation can be performed in multiple ways, the compiler may come across a situation where the same IR instruction can be achieved using any one of more than one assembly operations or instructions supported by the processor. For example, multiplication of an integer by any integral power of 2 can be achieved either by multiplication (multiplying by 2) or a left shift operation (shifting left by 1). Similarly, division of an integer by any integral power of 2 can be achieved either by division (dividing by 2) or by a right shift operation (shifting right by 1). Hence a single arithmetic operation may be achieved using any one of several alternative operations. Similarly, a single logical operation may also be achieved using any one of two or more alternative operations. Those alternative operations are different from each other, but generate the same result in the end.

Application programs targeting different problems or market segments usually have different requirements. In some application programs, some computations are done much more often as compared to other computations. Therefore, it is not easy to design a single computer architecture with which a computer performs best for all types of application programs. Consequently, this inspired computer architecture designers to design architectures which suit more to a specific type of application programs. To exploit these new architectures, more complex and efficient instruction sets are designed to favor specific application programs on certain specific architectures.

For example, matrix operations are foundations for application programs of image rendering. A very basic operation in manipulating a matrix is multiplying two elements and adding the result to a third element, which would require 3 operands. These operations are so commonly seen that many types of architectures have introduced a special instruction in their instruction set for such operations, namely, MADD (Multiplication and ADDition). Modern GPU (Graphical Processing Unit) architectures are powerhouses for MADD operations, by which GPUs can execute an astonishing number of such computations in a very short amount of time. Inspired by the modern GPU architectures, architects design many general purpose architectures also having similar instructions in their instruction sets. To facilitate computations when addition is not followed by multiplication and when distinct addition and multiplication need to be executed in isolation, the instruction sets usually also include distinct instructions for addition operation and multiplication operation, e.g. ADD (ADDition) and MUL (MULtiplication).

In summary, the same IR instruction may be achieved by two or more alternative assembly instructions. The same computation may be achieved either by a single operation (e.g. MADD) or by a sequence of two or more operations (e.g. MUL and ADD).

Because of the above-mentioned two reasons, compilers commonly perform a selection of an instruction amongst alternative assembly instructions generating the same final result.

An instruction selector that is a module performing processing of instruction selector phase identifies intermediate representation of an instruction (i.e. one or more IR instructions) having more than one possible alternative target assembly instruction sequence. The instruction selector then selects one optimal assembly instruction sequence based on criteria from available alternative assembly instruction sequences. The criteria of optimality may depend upon various factors such as a size of an executable, a speed of the executable, register pressure, the number of live registers and other factors. Independent of the criteria, the instruction selector always translates one or more IR instruction sequence into a single optimal assembly instructions sequence. The IR instruction sequence is one IR instruction or a series IR instructions.

The instruction selector may make an instruction selection, i.e. a selection of assembly instruction sequence, at a time of compiling. The instruction selection may be made independently of instruction scheduling. The instruction selection may be made together with instruction scheduling as described in PTL. 1. In the instruction selection of the PTL. 1, the same IR instruction sequences are mapped to one best assembly instruction sequence.

CITATION LIST

Patent Literature

[PTL 1]
U.S. Pat. No. 7,330,962

SUMMARY OF INVENTION

Technical Problem

The instruction selection plays a vital role in the total execution time for an application. The problem of selecting an optimal assembly instruction sequence for any IR instruction sequence resides in the very heart of a compiler. Selecting an optimal assembly instruction sequence determines how well the compiler can exploit the complex hardware architectures available for the execution of an application.

A compiler according to PTL. 1 selects, for each IR instruction sequence, one optimal assembly instruction sequence from a list including alternative assembly instruction sequences.

If source program includes repetition, such as a loop statement, a "goto" statement and the like, at least one IR instruction sequence is repeated more than once in IR generated from the source program. If an IR instruction sequence is repeated more than once, the compiler selects the optimal assembly instruction sequence for the IR instruction sequence more than once.

A processor executing a program generated from the source program may include dedicated execution units each configured to execute different instructions, such as MADD, ADD, MUL and the like. In such a case, the optimal assembly instruction sequence selected more than once may increase a load on only a single execution unit that is configured to execute an instruction corresponding to an assembly instruction included in the optimal assembly instruction sequence. Increase of a load on only a single execution unit may affect performance of the system including the processor since the execution units other than the single execution unit may be kept idle while the single execution unit repeatedly executes the instruction corresponding to the assembly instruction sequence selected more than once.

One of objects of the present disclosure is to provide an information processing apparatus and the like to improve performance of a system including execution units.

Solution to Problem

An information processing apparatus according to one of exemplary aspects of the present disclosure includes: alternate pattern identifier means for identifying first instruction sequences in a program in a first language, each of the first instruction sequences leading to a result individually achieved by second instruction sequences in a second language different from the first language, the second instruction sequences including operators being common to the first instruction sequences; pattern selector means for determining ratios for the operators of the second instruction sequences; and instruction scheduler means for selecting a second instruction sequence based on the ratios from the second instruction sequences for each of the first instruction sequences.

An information processing method according to one of exemplary aspects of the present disclosure includes: identifying first instruction sequences in a program in a first language, each of the first instruction sequences leading to a result individually achieved by second instruction sequences in a second language different from the first language, the second instruction sequences including operators being common to the first instruction sequences; determining ratios for the operators of the second instruction sequences; and selecting a second instruction sequence based on the ratios from the second instruction sequences for each of the first instruction sequences.

A storage medium according to one of exemplary aspects of the present disclosure stores a program causing a computer to execute: alternate pattern identifier processing for identifying first instruction sequences in a program in a first language, each of the first instruction sequences leading to a result individually achieved by second instruction sequences in a second language different from the first language, the second instruction sequences including operators being common to the first instruction sequences; pattern selector processing for determining ratios for the operators of the second instruction sequences; and instruction scheduler processing for selecting a second instruction sequence based on the ratios from the second instruction sequences for each of the first instruction sequences. One of the exemplary aspects of the present disclosure may be achieved by the program stored in the storage medium.

Advantageous Effects of Invention

According to the present disclosure, it is possible to improve performance of a system including execution units.

BRIEF DESCRIPTION OF DRAWINGS

FIG. 5 is a block diagram of an example configuration of an information processing apparatus according to a second exemplary embodiment of the present disclosure.

FIG. 6A is a flow chart of an example of overall operation of the information processing apparatus according to the first exemplary embodiment of the present disclosure.

FIG. 6B is a flowchart of an example code generation processing of the information processing apparatus according to the first exemplary embodiment of the present disclosure.

FIG. 6D is a flowchart of an example of the scheduling processing of the information processing apparatus according to the first exemplary embodiment of the present disclosure.

FIG. 7A is a flowchart of an example of overall operation in the information processing apparatus according to the second exemplary embodiment of the present disclosure.

FIG. 9 is an example operation of the information processing apparatus according to a third exemplary embodiment of the present disclosure.

DESCRIPTION OF EMBODIMENTS

Figure 1:
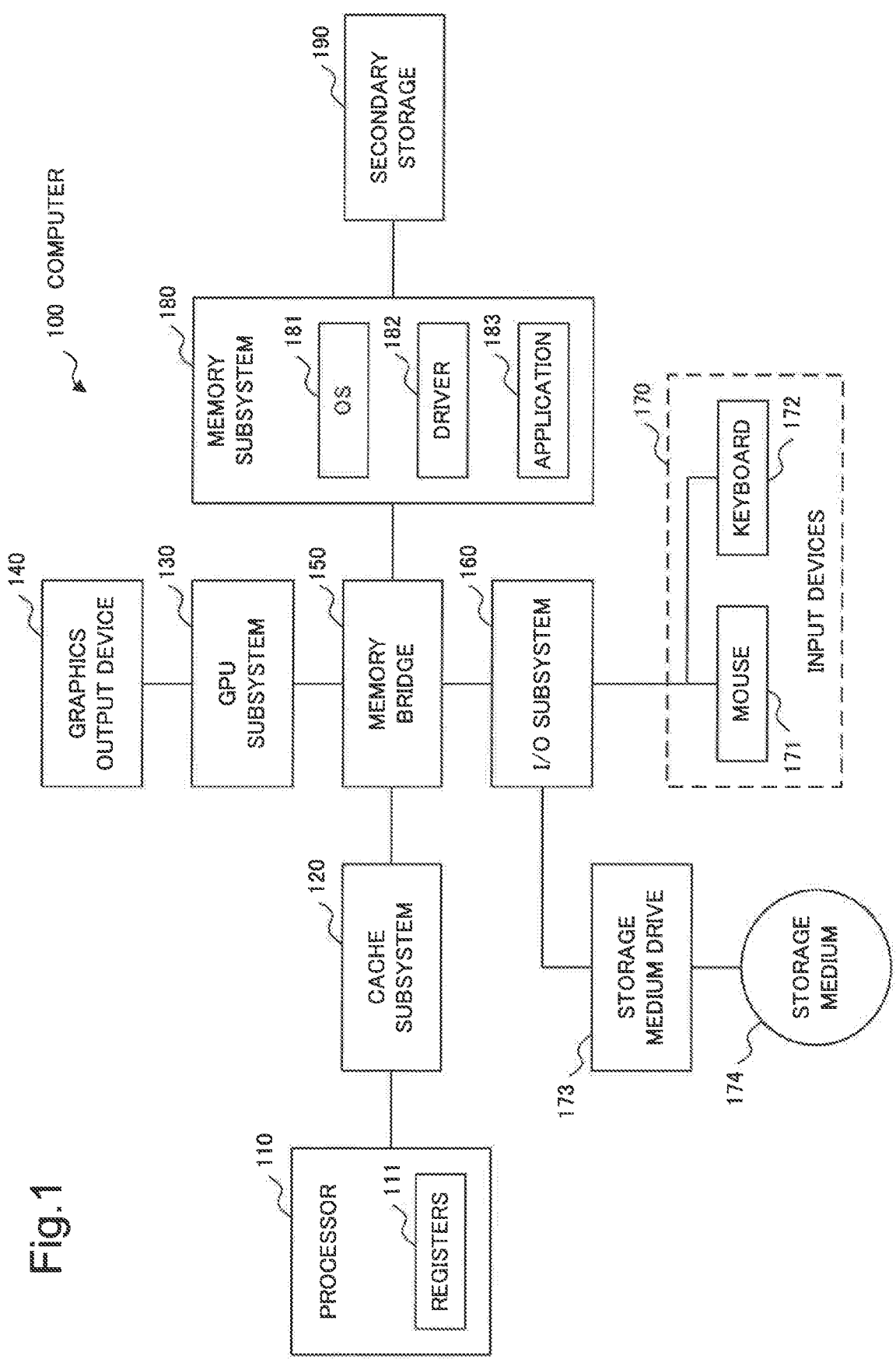
FIG. 1 is a block diagram of a configuration of a computer system by which information processing apparatuses according to exemplary embodiments of the present disclosure may be achieved.

FIG. 1 is a block diagram of a configuration of a computer 100 (also referred to as a "computer system") by which information processing apparatuses according to below-described exemplary embodiments of the present disclosure may be achieved. The computer system 100 includes a processor 110, a cache subsystem 120, a GPU subsystem 130, a graphics output device 140, a memory bridge 150, an I/O (Input/Output) subsystem 160, input devices 170 (e.g. a mouse 171 and a keyboard 172), a memory subsystem 180, and secondary storage 190. The computer system 100 may include a plurality of graphics output devices 140. The processor 110 includes registers 111. The registers 111 are used to stage data used by execution units included in the processor 110 from the cache subsystem 120. The registers 111 and other parts of the processor 110 are present on the same chip to reduce the latency. The cache subsystem 120 may have two or more levels of cache. The processor 110 and at least a level of cache subsystem may be implemented on the same chip. The number (e.g. level 1, level 2, level 3, etc.) and locations (on chip or off chip of the processor 110) of the levels may vary among systems having different architectures. Therefore, for sake of simplification of the variation in configuration among systems having different architectures, the cache subsystem 120 is shown as a module separated from the processor 110. The cache subsystem 120 is connected to the memory subsystem 180 via the memory bridge 150. The memory bridge 150 is connected to the GPU subsystem 130 and the I/O subsystem 160. The GPU subsystem 130 is connected to the graphics output device 140. The I/O subsystem 160 is connected to the input/output device. The memory subsystem 180 is connected to the secondary storage 190. Programs, such as an OS (operating system) 181, drivers 182 and an application 183 are loaded into the memory subsystem 180.

An example of the secondary storage 190 is an HDD (Hard Disk Drive) or the like. The secondary storage 190 may store a program which causes the computer 100 to operate as one of information processing apparatuses described below. The processor 110 may read out the copy of the program from the secondary storage 190, may load the program into the memory subsystem 180, and may execute the program loaded into the memory subsystem 180. The program may be loaded into a memory area of the memory subsystem 180, which is allocated to the program. The processor 110 is capable of accessing the program stored in the memory subsystem 180 via the memory bridge 150. After execution of the program, the copy of the program which was loaded in the memory subsystem 180 may be destroyed by freeing the memory area allocated to the program.

The I/O subsystem 160 may be connected with a storage medium drive 173 by which a storage medium 174 is accessible. The storage medium 174 may be a CD-ROM (Compact Disc Read Only Memory), a USB (Universal Serial Bus) memory, or one of other computer-readable removable media. The storage medium 174 may store a program which causes the computer 100 to operate as one of the information processing apparatuses described below.

The processor 110 is capable of accessing the program stored in the storage medium 174 via the storage medium drive 173. The processor 110 may read out the program from the storage medium 174, may load the program into the memory subsystem 180, and may execute the program loaded into the memory subsystem 180. The program stored in the storage medium 174 may be installed in the secondary storage 190. And the program installed into the secondary storage 190 may be loaded into the memory subsystem 180 and executed as described above.

First Exemplary Embodiment

Figure 2:
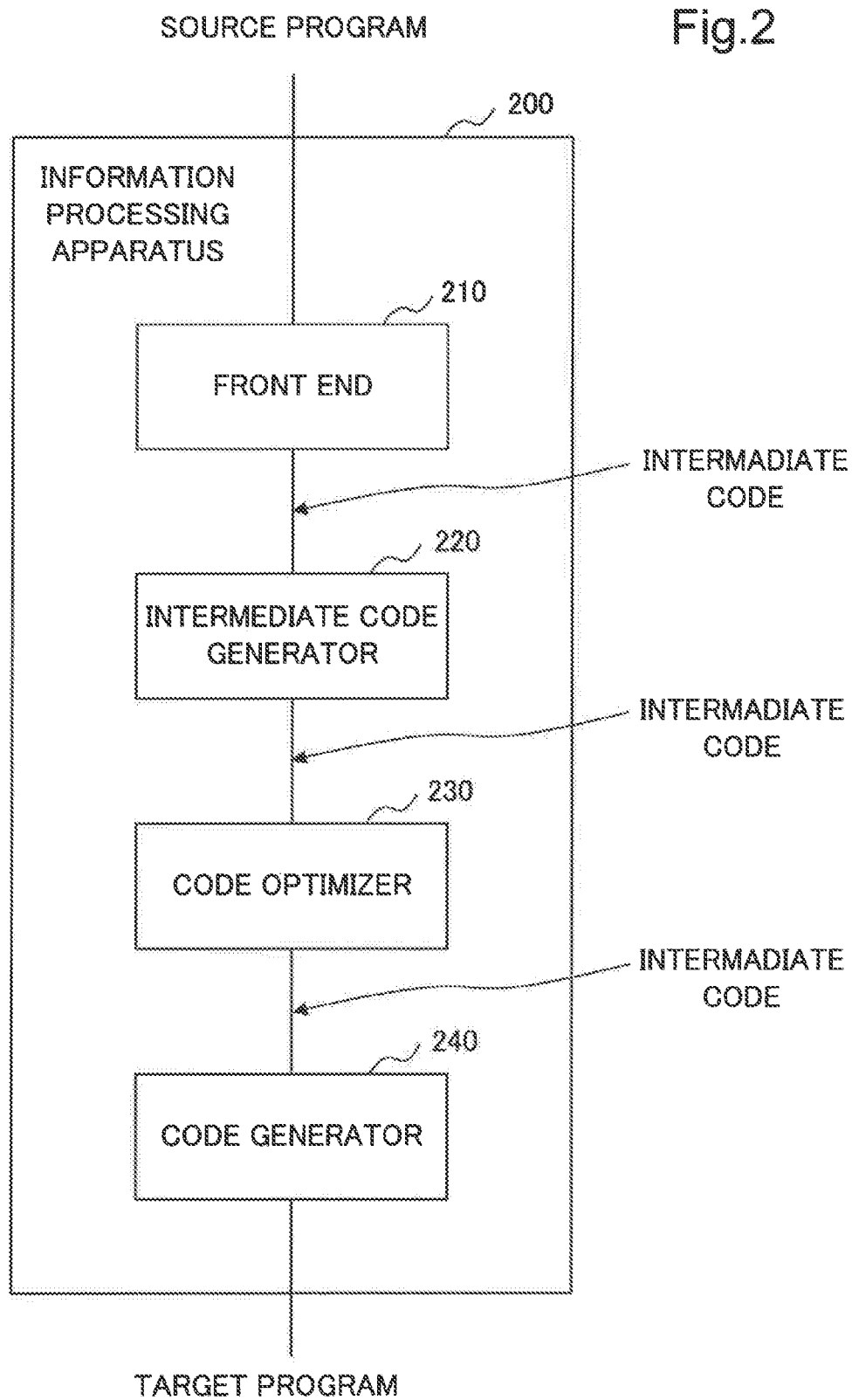
FIG. 2 is a block diagram of a schematic configuration of an information processing apparatus according to a first exemplary embodiment of the present disclosure.

FIG. 2 is a block diagram of a schematic configuration of an information processing apparatus 200 according to a first exemplary embodiment. The information processing apparatus 200 may be a compiler executing a program, which transforms a source program written in a programming language into a target program which is executable by the processor 110. The target program is kept in the secondary storage 190 in FIG. 1 during execution. The target program is copied into the memory subsystem 180, and is executed by the processor 110 of FIG. 1 with the help of linker and loader which are loaded in the memory subsystem 180 of FIG. 1.

The information processing apparatus 200 includes a front end 210, an intermediate code generator 220, a code optimizer 230 and a code generator 240.

Input to the information processing apparatus 200 is a source program. The information processing apparatus 200 transforms the source program into the target program. The front end 210 receives the source program as an input to the front end 210. The front end 210 operates as a lexical analyzer, a syntax analyzer, and a semantic analyzer. The lexical analyzer reads characters of the source program, and groups the characters into lexemes. The lexical analyzer then generates sequences of tokens for the lexemes. More specifically, the lexical analyzer generates a sequence of tokens for each of the lexemes. This process is known as tokenization. The lexical analyzer sends the sequence of tokens as input to the syntax analyzer. The syntax analyzer receives streams of the tokens sent from the lexical analyzer, derives a control flow of the source program from the streams of the tokens, and creates, for example, a directed acyclic graph (DAG) representing the control flow derived from the streams of tokens received from the lexical analyzer. The syntax analyzer sends the generated DAG as an input to the semantic analyzer. The semantic analyzer receives the DAG from the syntax analyzer, and checks if the source program has any semantic errors. The semantic analyzer sends the DAG to the intermediate code generator 220.

The intermediate code generator 220 transforms the input DAG into an intermediate form (i.e. intermediate representation) which is independent of both of the high-level programming language and the hardware architecture. The intermediate code generator 220 sends the intermediate representation to the code optimizer 230.

The code optimizer 230 receives the intermediate representation. The code optimizer 230 performs code optimization on the intermediate representation. In other words, the code optimizer 230 optimizes the intermediate representation by modifying intermediate instruction sequences included in the intermediate representation. The code optimizer 230 performs both machine-dependent optimization and machine-independent optimization. Examples of machine-dependent optimization are taking advantage of special hardware features, managing or hiding latency, introducing parallelism and the like. Examples of machine-independent optimization may be eliminating redundancy, eliminating useless and unreachable code, constant propagation, peep-hole optimization and the like. The code optimizer 230 sends the optimized intermediate representation to the code generator 240.

Finally, the code generator 240 receives the optimized intermediate representation, and selects the assembly instruction sequences for the intermediate instruction sequences included in the optimized intermediate representation. Selection of assembly instruction sequences may be executed with the help of a linker and a loader on a computer that executes the target program generated from the optimized intermediate representation. The information processing apparatus 200 may store a symbol table. The elements of the compiler share the symbol table, and use and update data of the symbol table. The information processing apparatus 200 may include an error handler.

When an error occurs in one of the elements of the compiler while compiling a program, the error handler may take control, and may output an appropriate message.

Figure 3:
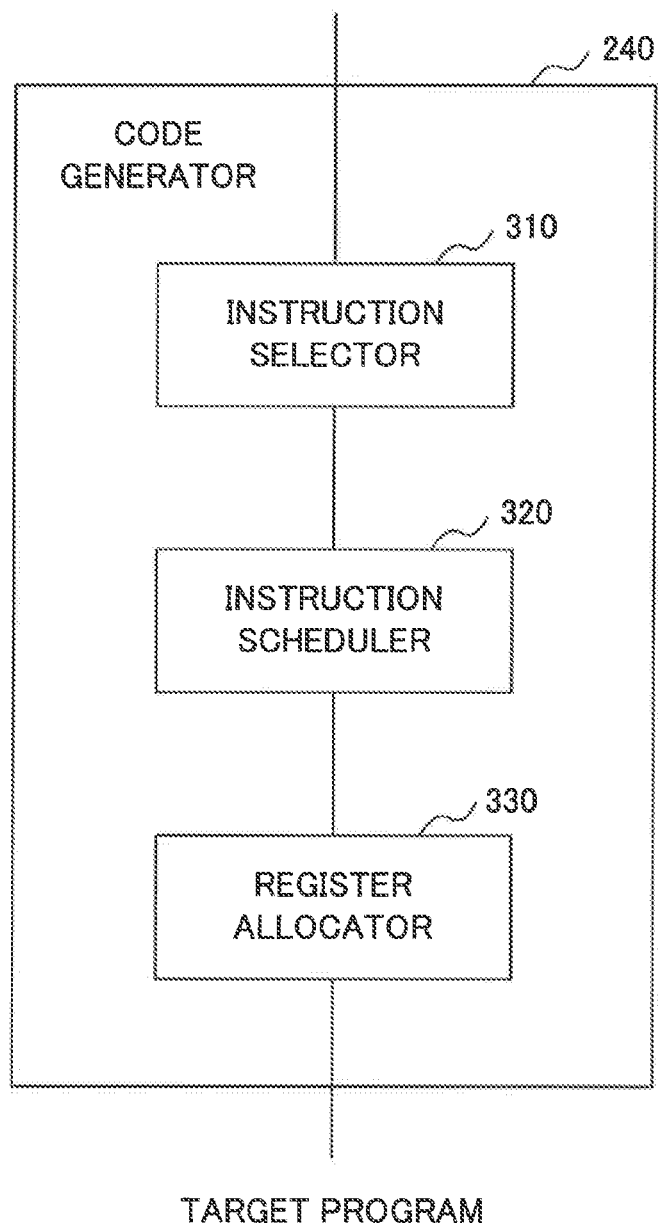
FIG. 3 is a block diagram of a detailed configuration of the code generator according to the first exemplary embodiment of the present disclosure.

FIG. 3 is a block diagram of a detailed configuration of the code generator 240.

The code generator 240 includes three modules, namely, an instruction selector 310, an instruction scheduler 320 and a register allocator 330. Input to the code generator 240 is intermediate code i.e. the intermediate representation described above. The intermediate code is generated by the intermediate code generator 220 of the front end 210, and is optimized and output by the code optimizer 230. The instruction selector 310 receives optimized intermediate code i.e. the intermediate code optimized by the code optimizer 230. The instruction selector 310 may select assembly instruction sequences for IR instruction sequences included in the intermediate code. The instruction selector 310 may select one assembly instruction sequence for each of the IR instruction sequences. The instruction scheduler 320 determines order of assembly instructions, which are included in the assembly instruction sequences, in the final target program. The register allocator 330 allocates registers in the registers 111 to each of the assembly instructions.

Figure 4:
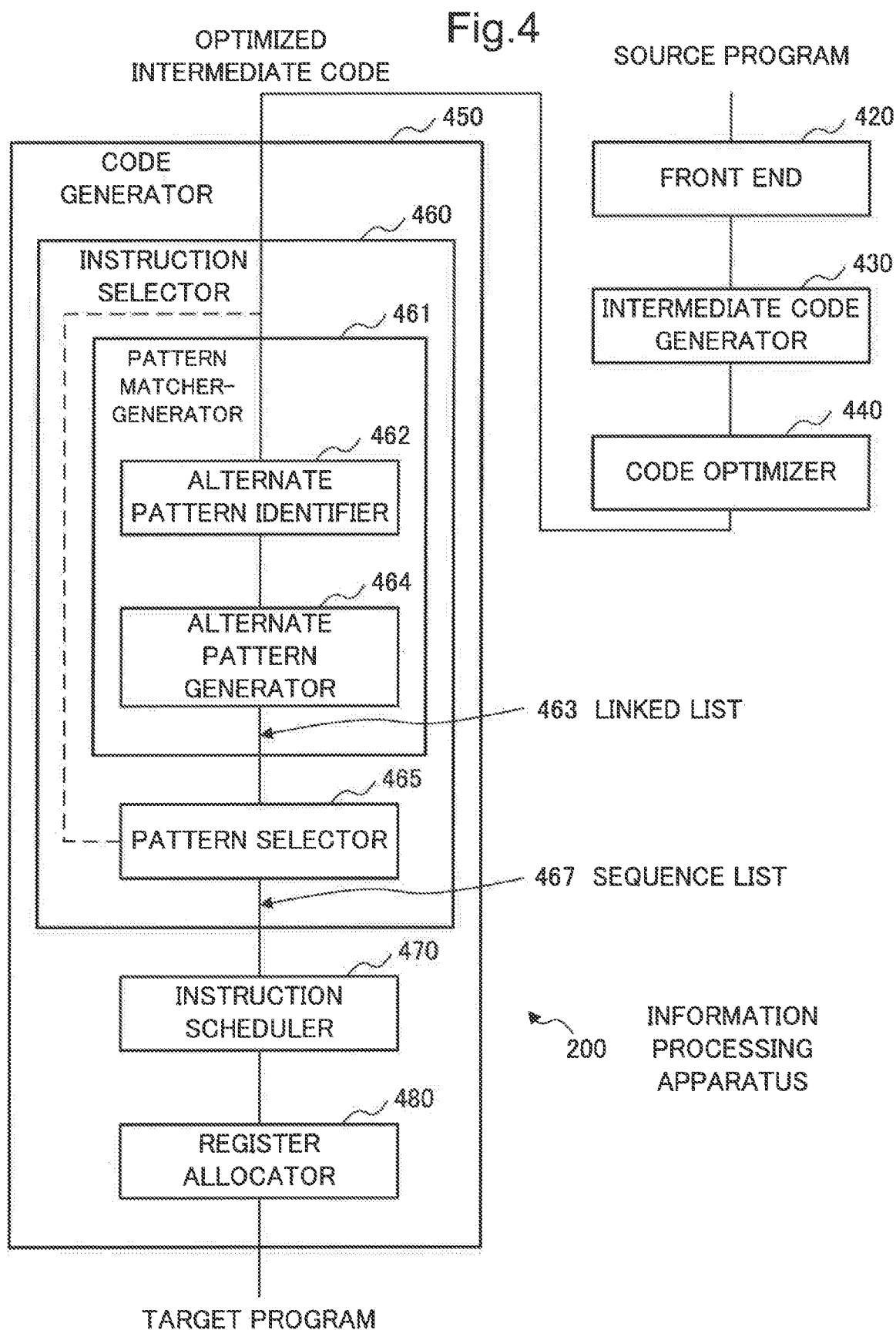
FIG. 4 is a block diagram of a detailed configuration of the information processing apparatus according to the first exemplary embodiment of the present disclosure.

FIG. 4 is a block diagram of a detailed configuration of the information processing apparatus 200 according to the present disclosure. The information processing apparatus 200 is configured along with a configuration of an existing compiler. The information processing apparatus 200 shown in FIG. 4 performs instruction selection independent of instruction scheduling.

The information processing apparatus 200 includes a front end 420, an intermediate code generator 430, a code optimizer 440, and a code generator 450. The code generator 450 includes an instruction selector 460, an instruction scheduler 470, and, a register allocator 480. The instruction selector 460 includes a pattern matcher-generator 461 and a pattern selector 465. The pattern matcher-generator 461 includes an alternate pattern identifier 462 and an alternate pattern generator 464. The front end 420, the intermediate code generator 430, the code optimizer 440, and the code generator 450 correspond to the front end 210, the intermediate code generator 220, the code optimizer 230, and the code generator 240 in FIG. 2, respectively.

In the example of FIG. 4, input to the information processing apparatus 200 is a source program written in a high-level programming language, and output of the information processing apparatus 200 is a target program.

The source code may be input using an input device such as the keyboard 172 by a user of the information processing apparatus 200. The source code may be sent from a terminal device or the like communicably connected with the information processing apparatus 200. The source code may be stored in advance in storage or a memory included in the information processing apparatus 200.

The front end 420 may receive the source program. The front end 420 may read out the source code from the storage or the memory. The front end 420 transforms the input source program to a directed acyclic graph. The configuration of the directed acyclic graph may be defined in advance and may differ depending on the configuration of the information processing apparatus 200. The front end 420 outputs the directed acyclic graph. The front end 420 may send the directed acyclic graph to the intermediate code generator 430.

The front end 420 may include the following three modules: a lexical analyzer, a syntax analyzer, and a semantic analyzer. The lexical analyzer receives the source program written in high-level programming language. The lexical analyzer converts the source program into a stream of tokens. This stream of tokens is then sent as an input to the syntax analyzer. The syntax analyzer receives the stream of tokens. The syntax analyzer converts the received stream of tokens into a directed acyclic graph, and sends the directed acyclic graph as an input to the semantic analyzer. The semantic analyzer receives this directed acyclic graph, and checks and ensures that declarations and statements of a program are semantically correct on the basis of the received directed acyclic graph. In other words, the semantic analyzer checks and ensures that the meanings of the declarations and the statements are clear and the declarations and the statements are consistent with the way in which control structures and data types of the declarations and the statements are supposed to be used in a program. The semantic analyzer may perform several types of checks on a program, such as, type checking, label checking, flow control checking. The semantic analyzer may output the directed acyclic graph when the declarations and the statements of a program are semantically correct. The semantic analyzer may output the directed acyclic graph to the intermediate code generator 430.

Input to the intermediate code generator 430 is the directed acyclic graph sent from the front end 420. The intermediate code generator 430 receives the directed acyclic graph. The intermediate code generator 430 transforms the directed acyclic graph into middle-level language representation i.e. representation in a middle-level language. The definition of the middle-level language representation may differ depending on the configuration of the information processing apparatus 200. The middle-level language representation is a variation of intermediate representation. The intermediate representation has the following properties: being independent of high-level programming languages, and being independent of the target hardware architecture. The intermediate code generator 430 outputs intermediate representation, i.e. the middle-level language representation described above.

The intermediate code generator 430 may send the intermediate representation as an input to the code optimizer 440.

Input to the code optimizer 440 is the intermediate representation of the source program output by the intermediate code generator 430. The code optimizer 440 receives the intermediate representation output by the intermediate code generator 430. The code optimizer 440 performs optimization including target-independent and target-dependent optimizations on the intermediate representation of the source program to generate optimized intermediate representation. The code optimizer 440 outputs the optimized intermediate representation. The code optimizer 440 may send the optimized intermediate representation as an input to the code generator 450.

Input to the code generator 450 is the optimized intermediate representation of the source program output by the code optimizer 440. The code generator 450 receives the optimized intermediate representation. The code generator 450 transforms the optimized intermediate representation of the source program into a target program which depends on the target hardware architecture and is capable of being executed by a computer having the target hardware architecture. Output of the code generator 450 is the target program. The code generator 450 outputs the target program. The code generator 450 is described in detail next.

The code generator 450 may include three modules: the instruction selector 460, the instruction scheduler 470 and the register allocator 480. The instruction selector 460, the instruction scheduler 470 and the register allocator 480 correspond to the instruction selector 310, the instruction scheduler 320 and the register allocator 330 in FIG. 3, respectively.

Input to the instruction selector 460 is the optimized intermediate representation of the source program output by the code optimizer 440. The instruction selector 460 receives the optimized intermediate representation of the source program. The instruction selector 460 transforms the received optimized intermediate representation of the source program into assembly representation of the source program. In other words, the instruction selector 460 transforms the intermediate instructions in the intermediate representation into assembly instructions of the assembly representation. The instruction selector 460 may transform one or more intermediate instructions into one or more assembly instructions on the basis of mapping of the intermediate instructions into the assembly instructions. The instruction selector 460 may transform one or more intermediate instructions in the intermediate representation into one or more assembly instructions to generate the assembly representation. Output of the instruction selector 460 is the assembly representation of the source program. The output of instruction selector 460 is the assembly representation of the source program. The instruction selector 460 may send the assembly representation of source program as an input to the instruction scheduler 470. The instruction selector 460 is described below in detail.

The instruction selector 460 may include the following two modules: the pattern matcher-generator 461, and the pattern selector 465.

Input to the pattern matcher-generator 461 may include the optimized intermediate representation of the source program which is output by the code optimizer 440 and input to the instruction selector 460. The pattern matcher-generator 461 has task of identifying patterns i.e. detecting when and where it is possible to use an assembly instruction sequence for any given intermediate instruction sequence, and a task of generating the patterns i.e. generating an assembly instruction sequence for each matched pattern from an alternate pattern identifier 462 described below. Each of the patterns can be thought of as a blueprint of an instruction sequence. The pattern matcher-generator 461 receives the optimized intermediate representation of the source program. The pattern matcher-generator 461 identifies an intermediate instruction sequence having alternative patterns, each of which represents an assembly instruction sequence i.e. a sequence of assembly instructions, and which lead to the same result as that of the intermediate instruction sequence, and generates the alternative patterns of the intermediate instruction sequence. In the following description, the expression that an intermediate instruction sequence matches an alternative pattern (i.e. an assembly instruction sequence in the alternative patterns) means that the intermediate instruction sequence and the alternative pattern lead to the same result. Similarly, the expression that an intermediate instruction sequence matches the alternative patterns means that the intermediate instruction sequence and each of the assembly instruction sequences lead to the same result. The pattern matcher-generator 461 may identify all intermediate instruction sequences that has alternative patterns in the optimized intermediate representation of the source program, and may generate all alternative patterns which match any one of the intermediate instruction sequences in the optimized intermediate representation of the source program. Output of the pattern matcher-generator 461 is the alternative patterns which match the intermediate instruction sequences. The pattern matcher-generator 461 outputs the alternative patterns for each of the intermediate instruction sequences. The pattern matcher-generator 461 may send the alternative patterns as an input to the pattern selector 465. The pattern matcher-generator 461 is described below in detail.

The pattern matcher-generator 461 may include the following two modules: the alternate pattern identifier 462, and an alternate pattern generator 464.

Input to the alternate pattern identifier 462 is the optimized intermediate representation of the source program output by the code optimizer 440. The alternate pattern identifier 462 receives the optimized intermediate representation of the source program. The alternate pattern identifier 462 may perform matching between each of the intermediate instruction sequences and the patterns prepared in advance. The patterns prepared in advance are also referred to as "dictionary patterns". This matching performed by the alternate pattern identifier 462 is independent of the algorithm used for the pattern matching, like tree based pattern matching or graph based pattern matching etc. Output of the alternate pattern identifier 462 is, for an intermediate instruction sequence, all the identified alternative patterns matching the intermediate instruction sequence.

Each of the dictionary patterns may be a condition for selecting intermediate instruction sequences that can be transformed into any one of two or more different assembly instruction sequences leading to the same result. The two or more different assembly instruction sequences are referred to as "alternative patterns". In other words, the alternative patterns of an intermediate instruction sequence are assembly instruction sequences which are equivalent to the intermediate instruction sequence and lead to the same result that is the result of the intermediate instruction sequence. Further in other words, the alternative patterns of an intermediate instruction sequence are assembly instruction sequences by which the result by the intermediate instruction sequence is achieved. The different alternative patterns i.e. different assembly instruction sequences are executed by a different set of operation units (i.e. arithmetic and logic units; ALU), such as an adder, a multiplier and a shifter, of a processor by which the target program is executed. The intermediate instruction sequence(s) that can be transformed into two or more alternative patterns, i.e. the intermediate instruction sequence(s) that can be achieved by two or more assembly instruction sequences leading to the same result, is referred to as the "intermediate instruction sequence(s) with alternative patterns". The dictionary patterns and the alternative patterns for each of the dictionary patterns may be prepared. The alternate pattern identifier 462 may store the dictionary patterns in advance.

The alternate pattern identifier 462 may perform matching the intermediate instruction sequences with the dictionary patterns by comparing each of the intermediate instruction sequences included in the optimized intermediate representation with the dictionary patterns.

The alternate pattern identifier 462 may identify all the intermediate instruction sequences with alternative patterns in the intermediate representation generated from the source program. All the alternative patterns for the intermediate representation are identified, so that the pattern selector 465 can select any combination of the alternative patterns along with their ratios.

A technique and a method of such matching of the intermediate instruction sequence with the dictionary patterns may vary depending on the configuration of the information processing apparatus 200.

Assuming that each of the intermediate instructions of the intermediate instruction sequences includes an operator and one or more operands, each of the dictionary patterns may include a sequence of conditions for selecting a sequence of intermediate instructions with certain operators. The dictionary patterns may include a sequence of conditions for selecting intermediate instructions with certain operands.

In the following description of an example, an intermediate instruction includes only a single intermediate instruction, and each of the alternative patterns includes only a single assembly instruction. An example of a condition for an intermediate instruction "multiply r, r, 2", which indicates multiplying a value stored in a register named "r" by 2, and storing a result of the multiplying in the register named "r", is a combination a condition that matches the operator "multiply" and a condition that matches the third operand "2". The alternative patterns may be, for example, "mul r, r, 2", "shl r, r, 1" and "fmul r, r, 2.0", which are assembly instructions. The assembly instruction "mul r, r, 2" indicates multiplying an integer stored in a register named "r" by 2, and storing a result of the multiplying in the register named "r". The assembly instruction "shl r, r, 1" indicates performing left shift operation on a value stored in the register named "r", and storing a result of the shift-left operation in the register named "r". The assembly instruction "fmul r, r, 2.0" indicates multiplying a floating-point number stored in the register named "r" by 2.0, and storing a result of the multiplying in the register named "r".

If the intermediate instruction "multiply r, r, 2" is included in an intermediate instruction sequence of the intermediate representation, the alternate pattern identifier 462 identifies the intermediate instruction "multiply r, r, 2" as an intermediate instruction with alternative patterns. The alternate pattern identifier 462 identifies the assembly instructions "mul r, r, 2", "shl r, r, 1" and "fmul r, r, 2.0" as the alternative patterns of the intermediate instruction "multiply r, r, 2".

The alternate pattern identifier 462 may further determine an execution count, i.e. the number of times of execution, for each of the intermediate instruction sequences with alternative patterns included in the optimized intermediate program. If the execution count for each of the intermediate instruction sequences with alternative patterns is fixed in the optimized intermediate program, the alternate pattern identifier 462 may count the execution count. The execution count for at least one of the intermediate instruction sequences with alternative patterns may be fixed at run time. In this case, the execution count may not be fixed exactly at compilation time. The alternate pattern identifier 462 may estimate the execution count on the basis of the optimized intermediate program by setting an initial condition. The execution count of an intermediate instruction sequence may be the number of times of execution of intermediate instruction sequences having the same set of alternative patterns.

The alternate pattern identifier 462 outputs the alternative patterns identified for the intermediate instruction sequences. The alternate pattern identifier 462 may send the identified alternative patterns as an input to the alternate pattern generator 464.

The alternate pattern identifier 462 may further send the execution count of each of the intermediate instruction sequences with alternative patterns to the pattern selector 465 via the alternate pattern generator 464. In other words, the alternate pattern identifier 462 may send the execution count to the alternate pattern generator 464, and the alternate pattern generator 464 may receive the execution count and send the execution count to the pattern selector 465.

The pattern selector 465 described below in detail may determine the execution count for each of the intermediate instruction sequences with alternative patterns included in the optimized intermediate program. In this case, it is not necessary for the alternate pattern identifier 462 to determine and send the execution count for each of the intermediate instruction sequences with alternative patterns. And it is not necessary for the alternate pattern generator 464 to receive and send the execution count for each of the intermediate instruction sequences with alternative patterns.

The alternate pattern generator 464 receives the identified alternative patterns sent from the alternate pattern identifier 462. The alternate pattern generator 464 may further receive the execution count of each of the intermediate instruction sequences with alternative patterns. Each of the intermediate instruction sequences with alternative patterns is hereinafter referred to as a "plural-alternative sequence". The alternate pattern generator 464 generates a linked list 463 representing the identified alternative patterns. The alternate pattern generator 464 may maintain the linked list 463 for each of the intermediate instruction sequences with alternative patterns. Specifically, the alternate pattern generator 464 may generate a single linked list 463 for each of the intermediate instruction sequences. The alternate pattern generator 464 may generate the linked list 463 representing the alternative patterns so that, for example, the alternative patterns of the same plural-alternative sequence are correlated with each other. In the linked list 463, the alternate patterns of the same plural-alternative sequence are correlated with the same plural-alternative sequence.

Output of the alternate pattern generator 464 is the linked list for each of the intermediate instruction sequences with alternative patterns. The alternate pattern generator 464 outputs the linked list 463. The alternate pattern generator 464 may send the linked list 463 as an input to the pattern selector 465. As described above, the alternate pattern generator 464 may further send the execution count of each of the intermediate instruction sequences with alternative patterns to the pattern selector 465.

The pattern selector 465 may receive the optimized intermediate representation input from the code optimizer 440. The pattern selector 465 receives the linked list 463 sent from the alternate pattern generator 464. The pattern selector 465 may further receive the execution count of each of the intermediate instruction sequences with alternative patterns. As described above, the execution count of each of the intermediate instruction sequences may be determined by the alternate pattern identifier 462. The pattern selector 465 extracts the plural-alternative sequence whose execution count is more than one from the plural-alternative sequences whose alternative patterns are included in the linked list 463, i.e. from the plural-alternative sequences in the intermediate instruction sequences in the optimized intermediate representation.

The pattern selector 465 may select more than one alternative pattern for the extracted plural-alternative sequence whose execution count is more than one, and may determine ratios for the selected alternative patterns for the extracted plural-alternative sequence. The pattern selector 465 may select more than one alternative pattern for each of the extracted plural-alternative sequences whose execution counts are more than one. The pattern selector 465 may further determine ratios for the selected alternative patterns for each of the extracted plural-alternative sequences on the basis of, for example, a result of a cost benefit analysis. In other words, the pattern selector 465 may determine a ratio of each of the alternate patterns for each of the extracted plural-alternative sequences having their respective execution counts each being more than one. The ratio of an alternative pattern of a plural-alternative sequence is a ratio of the number of the alternative pattern being selected as an assembly instruction sequence for the plural-alternative sequence to the execution count of the plural-alternative sequence when transforming the optimized intermediate representation including the plural-alternative sequence into a target program. The execution count of the plural-alternative sequence is the number of assembly instruction sequences selected for the plural-alternative sequence in the intermediate representation. Each of the ratios may be represented by not negative number. The ratios may be represented by execution counts of the selected alternative patterns.

Logic for the cost benefit analysis may vary depending on the configuration of the information processing apparatus 200 and the configuration of the target program. The logic for the cost benefit analysis may be selected by a user of the information processing apparatus 200 via the input devices 170. The pattern selector 465 may determine the ratios on the basis of a cost benefit analysis with a combination of two or more kinds of logic. For example, the pattern selector 465 may determine the ratios so that the target program satisfies a condition of a size of an executable file, a condition of a speed, a condition of register pressure, a condition of the number of live registers, one of possible combinations of the above-mentioned conditions, or the like.

For example, assumptions in the following description is: a plural-alternative sequence is "multiply r, r, 2"; the alternative patterns for the plural-alternative sequence "multiply r, r, 2" are "mul r, r, 2", "shl r, r, 1" and "fmul r, r, 2.0"; a target processor that executes the target program includes one operation unit for each of the operations of "mul", "shl" and "fmul"; clocks for executing the operations of "mul r, r, 2", "shl r, r, 1" and "fmul r, r, 2.0" are seven, one and thirty, respectively; and the execution count of "multiply r, r, 2" is thirty five. In this case, in order to minimize time of executing the operation of "multiply r, r, 2" for thirty two times, the pattern selector 465 may determine the ratios as: an execution count of the operation "mul r, r, 2" is four; an execution count of the operation "shl r, r, 1" is twenty eight; and an execution count of the operation "fmul r, r, 2.0" is zero.

The pattern selector 465 may generate and output a list shown as a sequence list 467 in FIG. 4. The sequence list 467 includes the alternative patterns (i.e. the assembly instruction sequences individually leading to the same results) with their respective ratios, which may be represented by execution counts, for each of the plural-alternative sequences whose execution counts are more than one. The plural-alternative sequence having an execution count that is more than one appears more than once in the intermediate representation. The sequence list 467 may not include an alternative pattern whose ratio is zero.

The above-described operation of the pattern selector 465 may be considered as follows. The pattern selector 465 selects alternative patterns each having the ratios not being zero for a plural-alternative sequence whose execution count is more than one as an instruction sequence corresponding to the plural-alternative sequence. The pattern selector 465 may store the selected alternative patterns into the sequence list 467 as the instruction sequence, transformed from the plural-alternative sequence, in the sequence list 467.

The pattern selector 465 outputs the assembly instruction sequences with their respective ratios (e.g. execution counts) for each of the plural-alternative sequences. The pattern selector 465 may output the sequence list 467. The pattern selector 465 may send the sequence list 467 to the instruction scheduler 470.

The pattern selector 465 may select a single optimal alternative pattern (in other words, the best alternative pattern) for a plural-alternative sequence whose execution count is one from the alternative patterns of the plural-alternative sequence according to a method of selecting a pattern from a plurality of patterns. The pattern selector 465 may output the assembly instruction sequence selected as the single optimal alternative pattern for a plural-alternative sequence whose execution count is one and for an intermediate instruction sequence that is not a plural-alternative sequence. The pattern selector 465 may generate and output the sequence list 467 including an assembly instruction sequence selected for a plural-alternative sequence whose execution count is one. The above-described operation of the pattern selector may be considered as follows. The pattern selector 465 selects the single optimal alternative pattern for the plural-alternative sequence whose execution count is one as an instruction sequence, in the sequence list 467, transformed from the plural-alternative sequence.

The pattern selector 465 may select a single pattern (i.e. an assembly instruction sequence) for an intermediate instruction sequence that is not a plural-alternative sequence on the basis of the mapping from the intermediate instruction sequences to the assembly instruction sequences. The pattern selector 465 may output the single pattern selected for the intermediate instruction sequence that is not a plural-alternative sequence. The pattern selector 465 may generate and output the sequence list 467 including an assembly instruction sequence selected for an intermediate instruction sequence that is not a plural-alternative sequence. The above-described operation of the pattern selector may be considered as follows. The pattern selector 465 selects the assembly instruction sequence for the intermediate instruction sequence that is not a plural-alternative sequence as an instruction sequence, in the sequence list 467, transformed from the intermediate instruction sequence.

The pattern selector 465 may operate as follows. The pattern selector 465 may generate a duplicate of the optimized intermediate representation as the initial sequence list 467. The pattern selector 465 may read intermediate instructions from the optimized intermediate representation generated from the source program, and find plural-alternative sequences in the read intermediate instructions. The pattern selector 465 may simply transforms each of the intermediate instruction sequence not included in a plural-alternative sequence into an assembly instruction sequence on the basis of mapping of the intermediate instruction sequences on the assembly instruction sequences, and may replace the intermediate instruction sequence not included in a plural-alternative sequence with the transformed assembly instruction sequence to the sequence list 467.

When a plural-alternative sequence is found, the pattern selector 465 may check if the execution count of the plural-alternative sequence is more than one. If the execution count of the plural-alternative sequence is not more than one, the pattern selector 465 may select one best assembly instruction sequence for the plural-alternative sequence, and may replace the plural-alternative sequence with the assembly instruction sequence selected as the one best assembly instruction sequence in the sequence list 467.

If the execution count of the found plural-alternative sequence is more than one (i.e. two or more), the pattern selector 465 determines the ratios of the alternative patterns of the plural-alternative sequence. The pattern selector 465 may select alternative patterns with non-zero ratio, i.e. the alternative patterns the ratio of each of which is not zero, from the alternative patterns of the plural-alternative sequence, and replace the plural-alternative sequence with the selected alternative patterns with their respective ratios in the sequence list 467.

The order of the instruction sequences in the alternative list may be the same as the order of the intermediate instruction sequences from which the instruction sequences are transformed in the intermediate representation.

In this example, the sequence list 467 includes assembly instructions for the intermediate instructions which are not in the plural-alternative sequences whose execution counts are more than one. The sequence list 467 includes the alternative patterns with their respective ratios instead of assembly instructions for the plural-alternative sequences whose execution counts are more than one.

The instruction scheduler 470 may receive the above-described sequence list 467 which is output by the pattern selector 465. As described above, the sequence list 467 may include, as an instruction sequence, an assembly sequence transformed from an intermediate instruction sequence that is not a plural-alternative sequence. The sequence list 467 may include, as an instruction sequence, a single optimal alternative pattern (i.e. an assembly instruction sequence) selected for a plural-alternative sequence whose execution count is one. The sequence list 467 may further include, as an instruction sequence, alternative patterns with their respective ratios selected for a plural-alternative sequence whose execution count is more than one.

The instruction scheduler 470 receives, as the sequence list 467, the alternative patterns with their respective ratios for each of the plural-alternative sequences whose execution counts are more than one, i.e. the plural-alternative sequences each of which appears more than once in the intermediate representation.

The instruction scheduler 470 selects one of the alternative patterns for each of the plural-alternative sequences on the basis of the ratios. The ratio of an alternative pattern may be represented by the number of times that the alternative pattern is executed. In this case, the instruction scheduler 470 may transform the plural-alternative sequence into an alternative pattern of the plural-alternative sequence for the number of times represented by the ratio of the alternative patterns. The instruction scheduler 470 may select one of the alternative patterns of the plural-alternative sequence, and replace the plural-alternative sequence with the selected alternative pattern so that, in the sequence list 467, the proportion of a certain alternative pattern of the alternative patterns to the number of the plural-alternative sequence is proportional to the ratio of the certain alternative pattern. When each of the plural-alternative sequences is replaced with an alternative pattern in the sequence list 467, the sequence list includes no plural-alternative sequence but assembly instructions.

The instruction scheduler 470 schedules instructions (i.e. the assembly instructions) of the instruction sequences which are included in the sequence list 467. In other words, the instruction scheduler 470 determines order of the assembly instructions in the target program.

The method of scheduling (i.e. determining the order of the instructions) by the instruction scheduler 470 may be one of the existing methods of scheduling the assembly instructions. The instruction scheduler 470 may output the assembly instructions arranged in the order determined by the instruction scheduler 470. The instruction scheduler 470 may send the assembly instructions arranged in the determined order to the register allocator 480.

The register allocator 480 receives the arranged (i.e. scheduled) assembly instructions output by the instruction scheduler 470. The register allocator 480 allocates registers available in the target machine to the assembly instructions. More specifically, the register allocator 480 allocates a register to an operand in assembly instructions if the operand is a register operand that is an operand referring to a register and register allocation is required. The register allocator 480 does not allocate registers to a memory operand that is an operand referring to a memory location and register allocation is not required. The register allocator 480 generates a target program, which can be executed by a computer having the target hardware architecture, from the arranged assembly instructions to which registers are allocated. The register allocator 480 outputs the target program.

Next, an example of operation of the information processing apparatus is described in detail with reference to drawings.

FIGS. 6A, 6B, 6C and 6D are flowcharts of an example of operation of the information processing apparatus 200 according to the present exemplary embodiment of the present disclosure. The information processing apparatus 200 according to the present exemplary embodiment performs the instruction selection independent of the instruction scheduling.

FIG. 6A is a flow chart of an example of overall operation of the information processing apparatus 200. According to the flow chart of FIG. 6A, the front end 420 analyzes a source program (Step S611). The source program may be input to the information processing apparatus 200. The source program may be stored in the information processing apparatus 200 in advance. The intermediate code generator 430 generates intermediate representation from the source program, i.e. the intermediate code generator 430 transforms the source program into the intermediate representation (Step S612). The code optimizer 440 optimizes the intermediate representation generated by the intermediate code generator 430 (Step S613). Then the code generator 450 performs code generation processing as described later in detail to generate a target program from the intermediate representation transformed from the source code (Step S614). The code generator 450 outputs the target program (Step S615).

FIG. 6B is a flowchart of an example code generation processing of the information processing apparatus 200.

The alternate pattern identifier 462 searches the intermediate representation for the intermediate instruction sequences each of which can be achieved by any one of two or more alternative patterns i.e. assembly instruction sequences leading to the same result, and identifies the intermediate instruction sequences which can be achieved by any one of two or more alternative patterns (Step S621). As described above, the intermediate instruction sequences which can be achieved with two or more alternative patterns are referred to as "intermediate instruction sequences with alternative patterns" and also as "plural-alternative sequences".

Then, the alternate pattern generator 464 generates the alternative patterns for each of the plural-alternative sequences, i.e. the intermediate instruction sequence with alternative patterns, which are identified by the alternate pattern identifier 462 in Step S621 (Step S622). The alternate pattern generator 464 may generate operator and operands of each assembly instruction of two or more assembly instruction sequences that are the alternative patterns of the plural-alternative sequence on the basis of operator and operands of the plural-alternative sequence. The method of generating the alternative patterns of the plural-alternative sequence is predefined for each kind of plural-alternative sequences. The alternate pattern generator 464 may store the generated alternative patterns of the plural-alternative sequence into the linked list 463 in such a way that the alternative patterns of the plural-alternative sequence are correlated with each other and with the plural-alternative sequence for each of the plural-alternative sequences.

The pattern selector 465, for example, may determine the execution count of each of the plural-alternative sequences (i.e. the intermediate instruction sequences with alternative patterns) (Step S623). As described above, when the execution count of a plural-alternative sequence is not fixed exactly, the pattern selector 465 may estimate the execution count of the plural-alternative sequence.

The pattern selector 465 may determine ratios of alternative patterns for each of the plural-alternative sequences each having the execution counts more than one, i.e. the plural-alternative sequences each of which is executed more than once in the intermediate representation (Step S624).

The pattern selector 465 performs transform processing (Step S625) to generate the sequence list 467 including the alternative patterns and their respective ratios for the plural-alternative sequences each of which is executed more than once. The transform processing is described in detail later.

The instruction scheduler 470 performs scheduling processing (Step S626) to generate the assembly instructions. The scheduling processing is also described in detail later.

The register allocator 480 allocates registers of the processor 110 to the assembly instructions (Step S627), and generates the target program. The method of allocating registers to the assembly instructions may be one of existing methods of allocating registers.

Figure 6C:
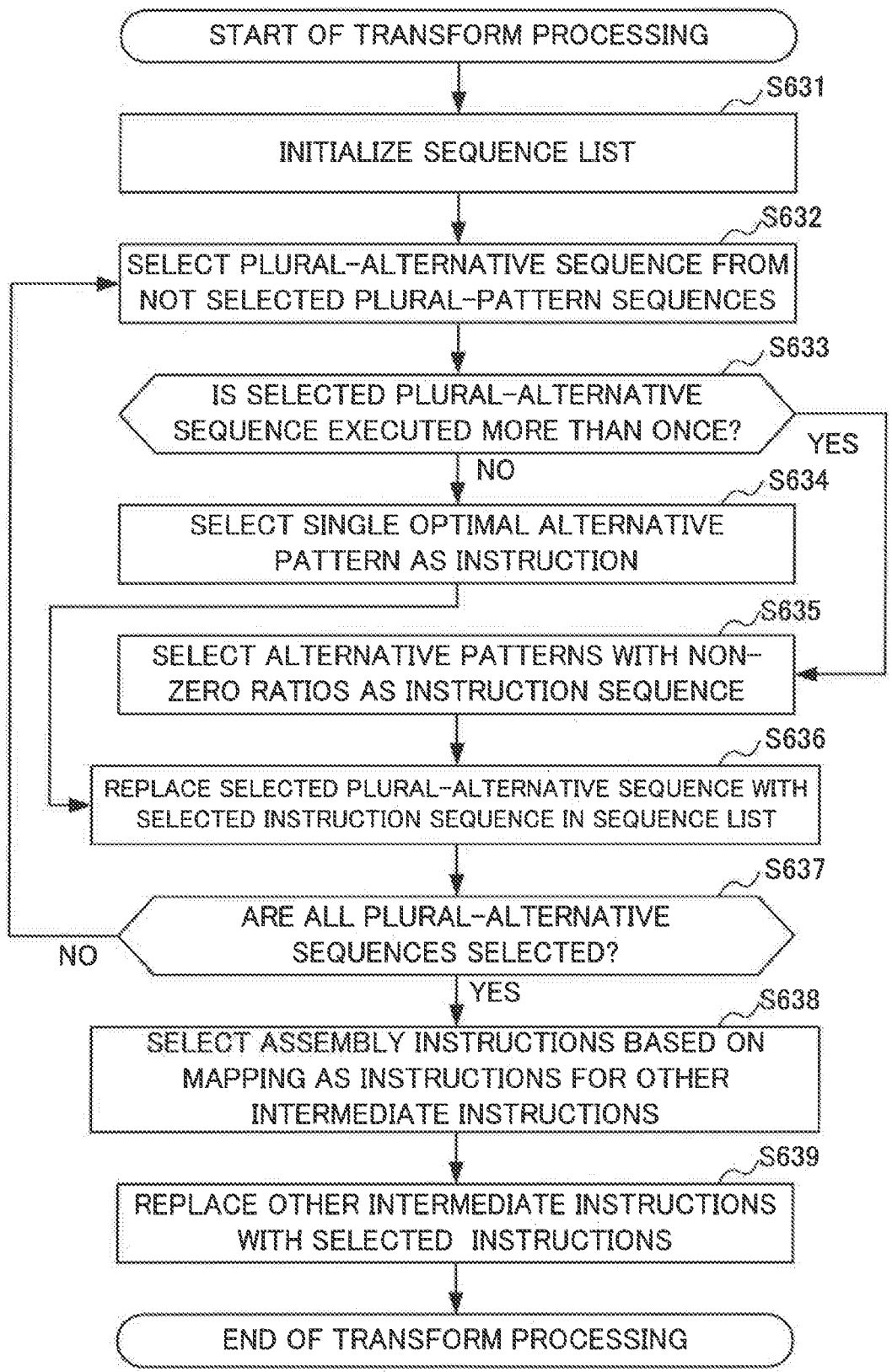
FIG. 6C is a flowchart of an example of transform processing of the information processing apparatus according to the first exemplary embodiment of the present disclosure.

FIG. 6C is a flowchart of an example of transform processing of the information processing apparatus 200 according to the present exemplary embodiment.

The pattern selector 465 may initialize the sequence list 467 (Step S631). The pattern selector 465 may generate a duplicate of linked list 463 as the sequence list 467.

The pattern selector 465 may select a plural-alternative sequence from not selected plural-alternative sequences in the sequence list 467 (Step S632).

The pattern selector 465 may determine if the selected plural-alternative sequence is executed more than once in the intermediate representation (Step S633). The pattern selector 465 may check the value of the execution count of the selected plural-alternative sequence to determine the number of times of the selected plural-alternative sequence being executed in the intermediate representation. If the execution count of the selected plural-alternative sequence is one, the plural-alternative sequence is executed once in the intermediate representation. If the execution count of a plural-alternative sequence is more than one, the plural-alternative sequence is executed more than once in the intermediate representation.

When a selected plural-alternative sequence is executed only once in the intermediate instruction (NO in Step S633), the pattern selector 465 may select a single optimal alternative pattern from the alternative patterns of the selected plural-alternative sequence as an instruction in the sequence list 467 for the selected plural-alternative sequence (Step S634).

When the selected plural-alternative sequence is executed more than once in the intermediate representation (YES in Step S633), the pattern selector 465 may select alternative patterns with non-zero ratios from the alternative patterns of the selected plural-alternative sequence. Each of the alternative patterns with non-zero ratios is an alternative pattern whose ratio is not zero. The pattern selector 465 may select the selected alternative patterns together with their respective non-zero ratios as an instruction in the sequence list 467 for the selected plural-alternative sequence (Step S635). In this case, assembly instruction sequences that are the selected alternative patterns and their ratios are selected as the instruction. When the number of the alternative patterns with non-zero ratios is only one, the pattern selector 465 may select the alternative pattern whose ratio is not zero as the instruction in the sequence list 467 for the plural-alternative sequence. In this case, an assembly instruction sequence that is the alternative pattern whose ratio is not zero is selected as the instruction.

Next, the pattern selector 465 may replace the plural-alternative sequence with the selected instruction in the sequence list 467 (Step S636). As described above, the selected instruction may be an assembly instruction sequence, or assembly instruction sequences and their respective ratios. The pattern selector 465 may replace, with an assembly instruction sequence as the instruction sequence, the plural-alternative sequence other than a plural-alternative sequence whose alternative patterns includes two or more alternative patterns with non-zero ratios. The pattern selector 465 may replace, with the alternative patterns and their respective ratios as the instruction sequence, the plural-alternative sequence whose alternative patterns include two or more alternative patterns with non-zero ratios.

When not all the plural-alternative sequences in the intermediate representation are selected (NO in Step S637), the operation of the information processing apparatus 200 returns to the Step S632, and the information processing apparatus 200 repeats the operation from the Step S632. When all the plural-alternative sequences in the intermediate representation are selected (YES in Step S637), the pattern selector 465 selects assembly instructions based on the mapping from the intermediate instructions to the assembly instructions as an instruction for the selected intermediate instruction in the sequence list 467 for the other intermediate instructions, i.e. intermediate instructions not included in the plural-alternative sequences (Step S638). The pattern selector 465 replaces the other intermediate instructions with the selected instructions, i.e. the selected assembly instructions (Step S639). The information processing apparatus 200 ends the operation of FIG. 6C.

FIG. 6D is a flowchart of an example of the scheduling processing of the information processing apparatus 200 according to the present exemplary embodiment. The instruction scheduler 470 starts the operation in FIG. 6D when the instruction scheduler 470 receives the sequence list 467.

The instruction scheduler 470 may identify instructions of alternative patterns with non-zero ratios in the sequence list 467 (Step S641). Each of the instructions of alternative patterns with non-zero ratios is alternative patterns and their respective included in the sequence list 467 as the instruction sequence. When instructions of alternative patterns with non-zero ratios are not in the sequence list 467 (NO in Step S642), the instruction scheduler 470 schedules the instructions in the sequence list 467 (Step S644). Then the information processing apparatus 200 ends the operation of the flowchart in FIG. 6D.

When instructions of alternative patterns with non-zero ratios are in the sequence list 467 (YES in Step S642), the instruction scheduler 470 may select one alternative pattern of the alternative patterns with non-zero ratios on the basis of the ratios of the alternative patterns for each of the instructions of alternative patterns with non-zero ratios (Step S643). The instruction scheduler may replace the instruction sequence of alternative patterns with non-zero ratios with the alternative pattern (i.e. an assembly instruction sequence) selected for the instruction sequence for each of the instruction sequences of alternative patterns with non-zero ratios. The instruction scheduler 470 schedules the assembly instructions in the sequence list 467 (Step S644). Then the information processing apparatus 200 ends the operation of the flowchart in FIG. 6D.

The advantageous effect of the present exemplary embodiment is that it is possible to improve performance of a system including execution units.

When the same intermediate instruction sequences are transformed into the same assembly instruction sequences, the assembly instruction sequences transformed from the same intermediate instruction sequences may be executed only by the same execution unit, such as a multiplier, and the other execution units may be idle.

In the present exemplary embodiment, the alternate pattern identifier 462 identifies the plural-alternative sequence executed more than once. The pattern selector 465 determines the ratio for the alternative patterns of the identified plural-alternative sequences. The instruction scheduler 470 selects one of the alternative patterns (i.e. different assembly instruction sequences) on the basis of the ratios. As a result, each of the same intermediate instruction sequences may be transformed into an assembly instruction sequence of one of two or more different kinds, i.e. an assembly instruction of one of different sets of operators. An execution unit that executes an assembly instruction may be fixed depending on an operator included in the assembly instruction.

Accordingly, in the present exemplary embodiment, two or more different execution units may be used for executing the assembly instructions transformed from the same intermediate instruction sequences. The different execution units may work in parallel. This may lead to shortening of time for executing assembly instructions transformed from the same intermediate instruction sequences in comparison with a case where the same intermediate instruction sequences are transformed into assembly instructions having the same operator. Therefore, it is possible to improve performance of a system including execution units.

Second Exemplary Embodiment

FIG. 5 is a block diagram of an example configuration of an information processing apparatus 500 according to the second exemplary embodiment of the present disclosure.

The information processing apparatus 200 according to the first exemplary embodiment performs instruction selection independently of instruction scheduling. In other words, the information processing apparatus 200 determines the ratio of each of the alternative patterns independently of scheduling assembly instructions generated from a source program. In contrast, the information processing apparatus 500 performs instruction selection not independently of instruction scheduling. In other words, the information processing apparatus 500 determines the ratio of each of the alternative patterns on the basis of information available while scheduling assembly instructions.

The information processing apparatus 500 includes a front end 520, an intermediate code generator 530, a code optimizer 540, an alternate pattern identifier 550, an alternate pattern generator 561, an available list generator 564, a resource monitor 570, a scheduling criteria module 580, a pattern selector 582, an instruction scheduler 583, and a register allocator 584. As described above, the information processing apparatus 500 is achieved with a computer including a processor and a memory. The information processing apparatus 500 is drawn in FIG. 5 so as to include a processor 590 and a memory 591. As described below, the register allocator 584 outputs machine instructions that are executable instructions. The processor 590 executes the machine instructions output by the register allocator 584.

The front end 520 of FIG. 5 operates in the same manner as the front end 420 of FIG. 4 operates. The intermediate code generator 530 of FIG. 5 operates in the same manner as the intermediate code generator 430 of FIG. 4 operates. The code optimizer 540 of FIG. 5 operates in the same manner as the code optimizer 440 of FIG. 4 operates. The alternate pattern identifier 550 of FIG. 5 operates in the same manner as the alternate pattern identifier 462 of FIG. 4 operates. The alternate pattern generator 561 of FIG. 5 operates in the same manner as the alternate pattern generator 464 of FIG. 4 operates. A linked list 563 of FIG. 5, which is output by the alternate pattern generator 561, is the same as the linked list 463 of FIG. 4. A sequence list 567, which is output by the pattern selector 582, may be the same as the sequence list 467 of FIG. 4. The sequence list may not include ratios of the alternative patterns.

The resource monitor 570 monitors a resource, such as an execution unit, an ALU or the like, which may be used when a target program is executed by the processor 590 of the information processing apparatus 500, obtains a state of the resource as a result of monitoring, and outputs state information representing the state of the resource. The state of a resource may be a busy state indicating the resource is busy or a free state indicating the resource is free. The resource monitor 570 may output the state information including a value indicating busy or another value indicating busy as the output state for each of the resources. The resource monitor 570 may monitor resources, may obtain states of the resources, and outputs values each representing the states of the resources. The resource monitor 570 may receive the alternative patterns of a plural-alternative sequence from the alternate pattern identifier 550, and may obtain states of the resources which are used when the processor 590 executes the received alternative patterns. The resource monitor 570 may send the state information to the scheduling criteria module 580 and the pattern selector 582.

The scheduling criteria module 580 stores criteria for scheduling assembly instructions, which may be defined by a supervisor or a user of the information processing apparatus 500. The criteria may include a condition of a speed, a condition of register pressure, a condition of the number of live registers, one of possible combinations of the above-mentioned conditions, or the like. The criteria are not limited to the above-described example. The scheduling criteria module 580 may receive the state information from the resource monitor 570, and may update the criteria on the basis of the state information. The resource monitor 570 may update the criteria, for example, by excluding busy execution units from available execution units in the criteria when the state information includes information on execution units being currently busy, by excluding registers in use from available registers in the criteria when the state information includes information on registers being currently used, and the like. Such information may be used by the pattern selector 582 while determining a set of alternative patterns (i.e. assembly instruction sequences) so that the determined set of alternative patterns will be most beneficial. The method of updating the criteria is not limited to the above-described examples and may not include the above-described examples. The scheduling criteria module 580 outputs the criteria, which may be the updated criteria. The scheduling criteria module 580 may send the criteria to the pattern selector 582.

The pattern selector 582 receives the linked list 563 output by the alternate pattern generator 561, and the optimized intermediate representation output from the code optimizer 540. Similarly to the linked list 463, the linked list 563 includes alternative patterns for each of the plural-alternative sequences.

The pattern selector 582 may determine the execution count i.e. the number of times that each of the plural-alternative sequences, which are identified by the alternate pattern identifier 550, is executed in the optimized intermediate representations in the same manner as the pattern selector 465 determines the number.

The pattern selector 582 may select, for the plural-alternative sequence that is executed once in the optimized intermediate representation, a single optimal alternative pattern among the alternative patterns of the plural-alternative sequence as an instruction in the sequence list 567. The pattern selector 582 may select, for the plural-alternative sequence that is executed more than once in the optimized intermediate representation, the alternative pattern of the plural-alternative sequence as an instruction in the sequence list 567. The pattern selector 582 may select, for the intermediate instructions which are included in optimized intermediate representations and are other than the intermediate instruction included in the plural-alternative sequence, assembly instructions on the basis of the mapping from the intermediate instruction sequences to the assembly instruction sequences.

Specifically, the pattern selector 582 may operate as follows. The pattern selector 582 may select a plural-pattern sequence from not selected plural-pattern sequences among the plural-pattern sequences identified by the alternate pattern identifier 550.

If the number of times that the selected plural-alternative sequence is executed in the optimized intermediate representation is one, i.e. the execution count of the selected plural-alternative sequence is one, the pattern selector 582 selects, as an instruction sequence in the sequence list 567 for the selected plural-alternative sequence, a single optimal alternative pattern from the alternative patterns of the selected plural-alternative sequence in the same manner as the pattern selector 465 does. As described above, each of the alternative patterns is an assembly instruction sequence. The selected single optimal alternative pattern is also an assembly instruction sequence.

If the number of times that the selected plural-alternative sequence is executed in the optimized intermediate representation is more than one, i.e. the execution count of the selected plural-alternative sequence is more than one, the pattern selector 582 selects, as an instruction sequence in the sequence list 567 for the selected plural-alternative sequence, the alternative patterns of the selected plural-alternative sequence.

The pattern selector 582 may select, as instructions in the sequence list 567 for the other intermediate instructions, assembly instructions on the basis of the mapping from intermediate instruction sequences to the assembly instruction sequences. The other intermediate instructions are intermediate instructions included in the optimized intermediate representation and not included in the plural-alternative sequences. The pattern selector 582 may repeat extracting an intermediate instruction sequence that can be transformed into an assembly instruction sequence, and selecting the assembly instruction sequence, as an instruction sequence in the sequence list 567, for the extracted intermediate instruction sequence, until all of the other intermediate instructions are extracted as a part of an intermediate instruction sequence.

The pattern selector 582 may initialize the sequence list 567 by duplicating the optimized intermediate representation as the sequence list 567. The pattern selector 582 may replace the plural-alternative sequence whose execution count is one with the single optimal alternative pattern selected as an instruction in the sequence list 567 for the plural-alternative sequence. The pattern selector 582 may replace the plural-alternative sequence whose execution count is more than one with the alternative patterns selected as the instruction in the sequence list 567 for the plural-alternative sequence. The pattern selector 582 may replace the other intermediate instructions with the assembly instructions selected as the instructions in the sequence list 567. The pattern selector 582 outputs the sequence list 567. The pattern selector 582 may send the sequence list 567 to the available list generator 564. As described above, the sequence list 567 may not include the ratios for the alternative patterns. The sequence list 567 may contain the ratios of the instructions.

The pattern selector 582 is further described below.

The available list generator 564 receives the sequence list 567 output by the pattern selector 582.

The sequence list 567 includes assembly instructions included in the single optimal alternative pattern, the assembly instructions transformed from intermediate instruction not included in the plural-pattern sequences, and the alternative patterns of the plural-pattern sequences whose execution counts are more than one. In short, the sequence list 567 includes the assembly instructions and the alternative patterns. In the following description, the instruction sequence included in the sequence list 567 is an assembly instruction of the assembly instructions, an assembly instruction of the single optimal alternative pattern, or the alternative patterns.

The available list generator 564 may extract an instruction sequence that can be executed next from the sequence list 567. The available list generator 564 may extract instruction sequences that are ready to be executed next from the sequence list 567. When no instruction sequence in the sequence list 567 is executed, the first instruction sequence of the sequence list 567 may one of the instruction sequences that are ready to be executed next. If there is an instruction sequence that is ready to be executed in parallel with the first instruction sequence in the sequence list 567, the instruction sequence is also one of the instruction sequences that are ready to be executed next. An instruction sequence (referred to as a "second instruction sequence") which uses a result of an instruction sequence (referred to as a "second instruction sequence") is not ready to be executed until the result of the second instruction sequence is derived. The available list generator 564 may extract an instruction sequence which does not use a result of another instruction sequence and an instruction sequence which uses a result of another instruction sequence the result of which is already derived. The available list generator 564 generates an available list 565 including the extracted instruction sequence that is ready to be executed next. The available list generator 564 outputs the extracted instruction sequence that can be executed next. The available list generator 564 may output the available list 565. The available list generator 564 may send the available list 565 to the instruction scheduler 583.

The instruction sequence that is read to be executed next is referred to as a "ready instruction sequence" below. As described above, the sequence list 567 may include alternative patterns as an instruction sequence. Therefore, the available list 565 may include the alternative patterns as a ready instruction sequence.

The available list generator 564 may analyze an operation flow represented by the sequence list 567 to extract the extracted instruction sequence that is ready to be executed next. Logic in the source program may be written according to a producer-consumer dataflow pattern where an instruction sequence generates data which is used as input of another instruction sequence. An instruction sequence which generates the data is called a producer instruction sequence (i.e. the first instruction sequence described above) and an instruction sequence which use the data generated by a producer instruction sequence is called a consumer instruction sequence (i.e. the second instruction sequence described above). A consumer instruction sequence is not able to be executed before the producer instruction sequence generates the data; this is known as "data hazard" in the terms of compilation.

The available list generator 564 outputs the instruction sequences using data that is already available to be consumed.

The pattern selector 582 further receives alternative patterns, which are ready to be executed as described below, from the instruction scheduler 583. The instruction scheduler 583 is described below in detail. When receiving the alternative patterns from the instruction scheduler 583, the pattern selector 582 may send a request for the state information to the resource monitor 570, and may send a request for the criteria to the scheduling criteria module 580. The pattern selector 582 receives the state information output by the resource monitor 570, and the criteria output by the scheduling criteria module 580.

The pattern selector 582 may determine ratios of the alternative patterns received from the instruction scheduler 583 on the basis of the state information output by the resource monitor 570, and the criteria output by the scheduling criteria module 580. In other words, the pattern selector 582 may determine the ratios of the alternative patterns on the basis of available resources, such as execution units, ALUs, and the like which is not in use. The pattern selector 582 may receive the alternative patterns from the instruction scheduler 583, and send the ratios of the received alternative patterns to the instruction scheduler 583.

The instruction scheduler 583 receives the instruction sequence which can be executed next. The instruction scheduler 583 may receive the available list 565 output by the available list generator 564.

The instruction scheduler 583 checks if the available list generator 564 outputs alternative patterns as a ready instruction sequence. The instruction scheduler 583 may extract alternative patterns included in the available list 565 as a ready instruction sequence. Hereinafter, available patterns included in the available list 565 as a ready instruction sequence is referred to as an "available pattern set".

When the alternative patterns are output by the available list generator 564 as a ready instruction sequence, i.e. the instruction scheduler 583 extracts at least one available pattern set included in the available list 565 as a ready instruction sequence, the instruction scheduler 583 checks if the same alternative pattern set as the alternative pattern is extracted.

In other words, the instruction scheduler 583 may determine the execution count for each of the ready instruction sequence that is the alternative patterns included in the available list 565. Further in other words, the instruction scheduler 583 may determine the execution count for each of the ready instruction sequence corresponding to the plural-alternative sequence in the available list 565.

In the present exemplary embodiment, an alternative pattern set (a first alternative pattern set) is the same as another alternative pattern set (a second alternative pattern set) when the operators included in the alternative patterns of the first alternative set is the same as the operators included in the alternative patterns of the second alternative set.

The instruction scheduler 583 may select a single optimal assembly instruction sequence for the available pattern set for which no same available pattern set is extracted. In other words, the instruction scheduler 583 may select a single optimal assembly instruction sequence for the available pattern set whose execution count is one. The instruction scheduler 583 may replace the available patterns of the available pattern set with the selected single optimal assembly instruction sequence.

When two or more alternative pattern sets are the same, for the alternative pattern sets, the instruction scheduler 583 may send the alternative patterns to the pattern selector 582. In other words, for the ready instruction sequence whose execution count is more than one, the instruction scheduler 583 may send the alternative patterns of the ready instruction sequence. The instruction scheduler 583 may receive ratios for the alternative patterns from the pattern selector 582. The instruction scheduler 583 may send the alternative patterns of the alternative pattern sets to the pattern selector 582. The instruction scheduler 583 may send, as the alternative patterns, a set of operators of the alternative patterns of the alternative pattern sets. The instruction scheduler 583 selects an alternative pattern from the alternative patterns received as a ready instruction sequence on the basis of the ratios. If the available list 565 includes two or more ready instruction sequences each of which is a set alternative patterns, the instruction scheduler 583 may send the alternative patterns of each of the sets to the pattern selector 582, may receive the ratios for the alternative patterns, and may select an alternative pattern from the alternative patterns on the basis of the ratios.

The instruction scheduler 583 may replace the alternative patterns included in the received available list 565 with the alternative pattern, which is an assembly instruction sequence as described above, selected for the alternative patterns.

As a result, the available list 565 includes no alternative pattern but includes assembly instructions, which are included in the assembly instruction sequences. The instruction scheduler 583 schedules the assembly instructions included in the available list 565. The instruction scheduler 583 outputs the assembly instructions.

The register allocator 584 receives the assembly instructions output by the instruction scheduler 583, and allocates registers to the received assembly instructions to generate machine instructions. The register allocator 584 outputs the machine instruction.

The processor 590 receives the machine instructions, and executes the machine instructions, by using the memory 591 if necessary. When finishing the machine instruction, the processor 590 may inform the available list generator 564 of information on the finished machine instruction.

The available list generator 564 may receive the information on the finished machine instruction, and may update the instruction sequences ready to be executed on the basis of the information on the finished machine instruction. More specifically, the available list generator 564 may identify the instruction sequence including an assembly instruction corresponding to the finished machine instruction, and may extract, as a new ready instruction sequence, an instruction sequence using data that becomes available when data generated by the finished machine instruction is available. Then the available list generator 564 may generate a new available list 565 including the new ready instruction sequence, and may send the new available list 565 to the instruction scheduler 583.

FIGS. 7A, 7B, 7C, 7D and 7E are flowcharts of an example operation of the information processing apparatus 500 of the present exemplary embodiment.

FIG. 7A is a flowchart of an example of overall operation in the information processing apparatus 500.

First, the front end 520 analyzes a source program input to the front end 520 (Step S711). Next, the intermediate code generator 530 transforms the source program into an intermediate representation (Step S712). The code optimizer 540 optimizes the intermediate representation (Step S713), and generates an optimized intermediate representation. Operations of Step S711, Step S712, and Step S713 are similar to the operations of Step S611, Step S612, and Step S613, respectively. Next, the information processing apparatus 500 performs code generation processing (Step S714). In the code generation processing, the information processing apparatus 500 transforms the optimized intermediate code into machine instructions, and output the machine instructions. The code generation processing in Step S714 is described in detail below.

Figure 7B:
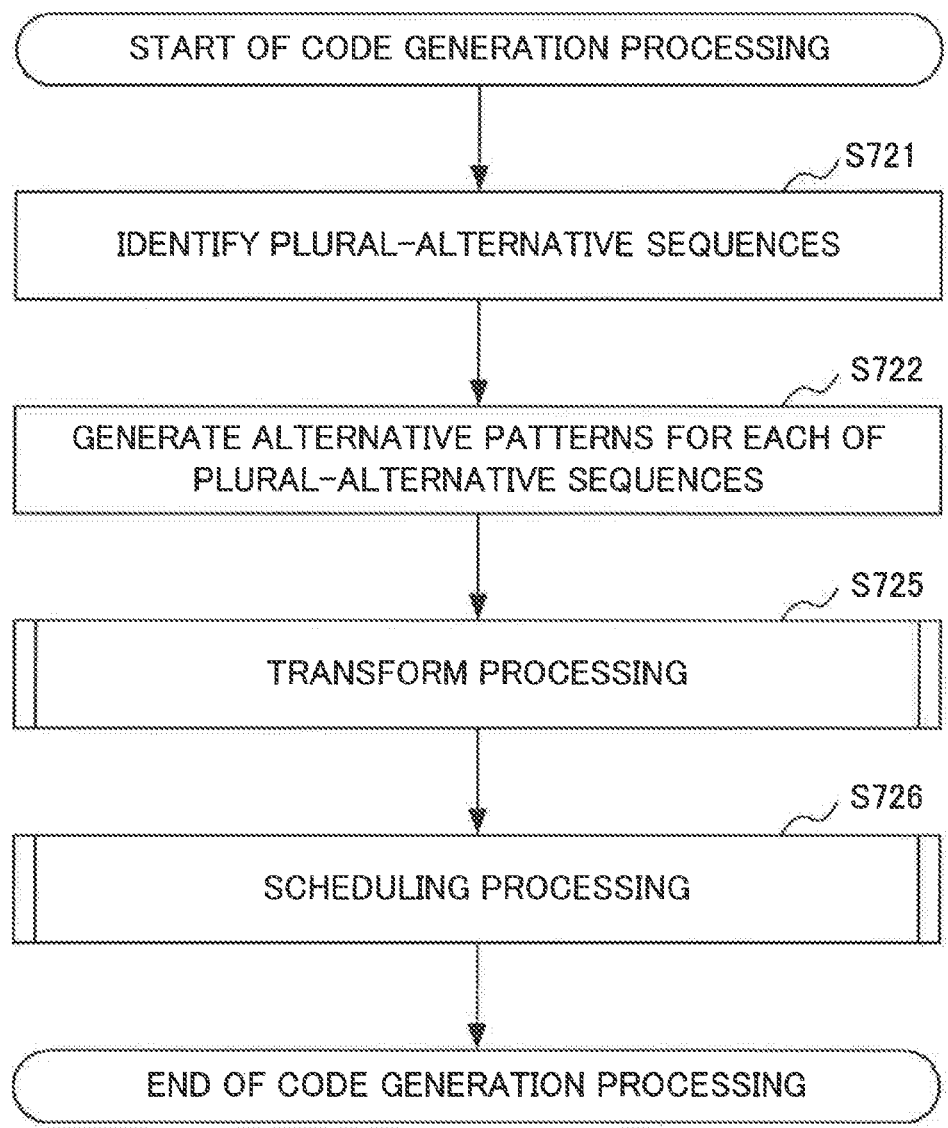
FIG. 7B is a flowchart of an example operation in the code generation processing of the information processing apparatus 500 according to the second exemplary embodiment of the present disclosure.

FIG. 7B is a flowchart of an example operation in the code generation processing of the information processing apparatus 500 of the present exemplary embodiment.

The alternate pattern identifier 550 identifies the plural-alternative sequences in the optimized intermediate representation (Step S721). The alternate pattern generator 561 generates the alternative patterns for each of the plural-alternative sequence (Step S722). Operations of Step S721 and Step S722 are similar to the operations of Step S621 and Step S622, respectively. Then, the information processing apparatus 500 performs transform processing (Step S725), and scheduling processing (Step S726). In the transform processing, the information processing apparatus 500 transforms the optimized intermediate representation into the sequence list 567 including assembly instructions. The sequence list 567 may further include an instruction sequence of alternative patterns. In other words, the sequence list 567 may include alternative patterns as an instruction sequence (i.e. an instruction sequence of alternative patterns). The instruction sequence of alternative pattern is alternative patterns of the plural-alternative sequence, which are transformed from the plural-alternative sequence. In the scheduling processing, the information processing apparatus 500 selects an alternative pattern from alternative patterns included in the sequence list 567 as an instruction sequence on the basis of the state of a computer that executes machine instructions generated from the source program. In the present exemplary embodiment, the information processing apparatus 500 is the computer that executes the machine instructions generated from the source program. The transform processing in Step S725 and the scheduling processing in Step S726 are described in detail below.

Figure 7C:
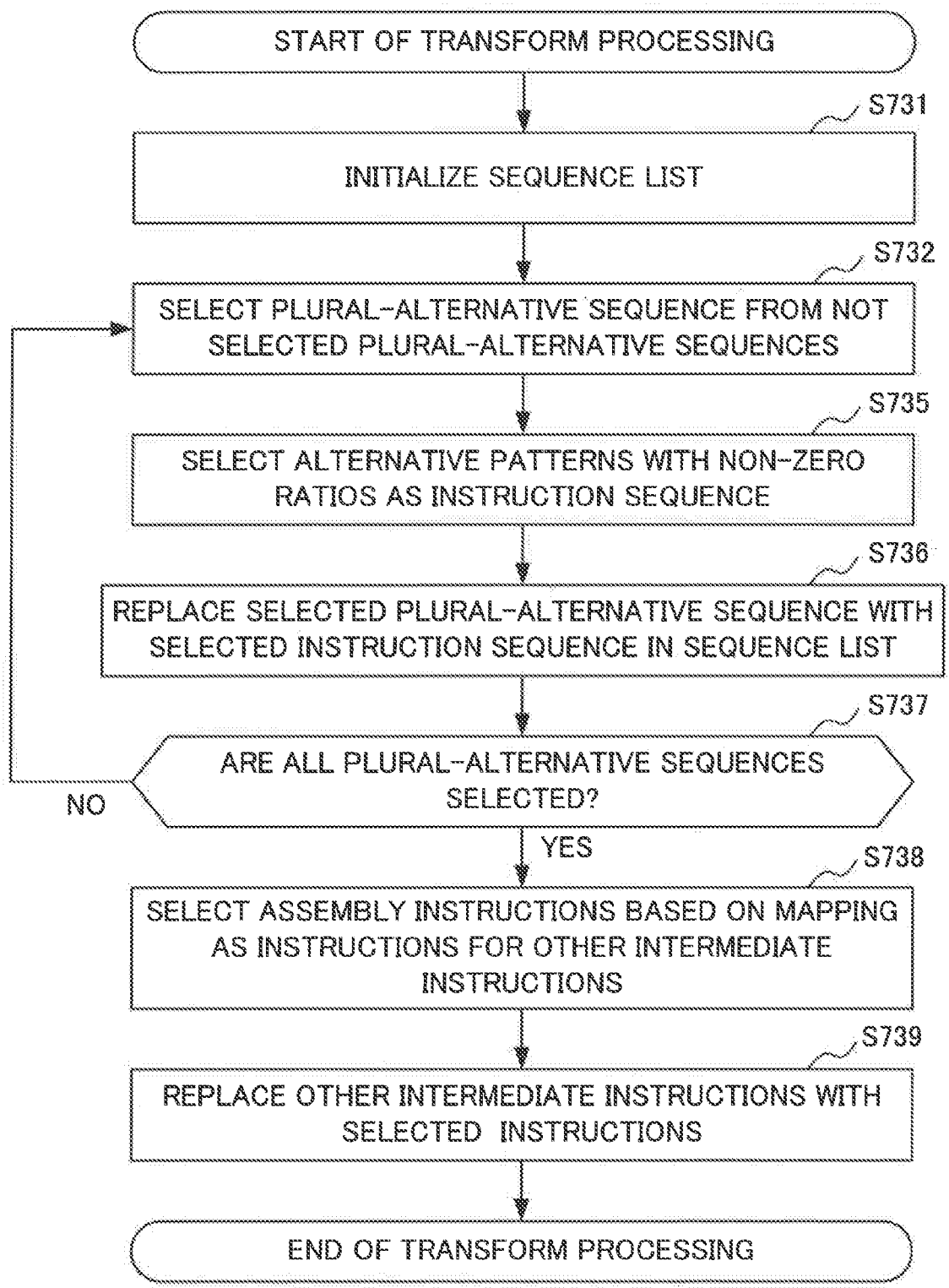
FIG. 7C is a flowchart of an example operation of the transform processing of the information processing apparatus according to the second exemplary embodiment of the present disclosure.

FIG. 7C is a flowchart of an example operation of the transform processing of the information processing apparatus 500.

The pattern selector 582 may initialize the sequence list 567 (Step S731). The pattern selector 582 may generate a duplicate of linked list 563 as the sequence list 567.

The pattern selector 582 selects a plural-alternative sequence from not selected plural-alternative sequences in the sequence list 567 (Step S732).

The pattern selector 582 may select alternative patterns with non-zero ratios from the alternative patterns of the selected plural-alternative sequence as an instruction in the sequence list 567 for the selected plural-alternative sequence (Step S735). As described above, each of the alternative patterns with non-zero ratios is an alternative pattern whose ratio is not zero. Assembly instruction sequences that are the selected alternative patterns and their ratios are selected as the instruction. When the number of the alternative patterns with non-zero ratios is only one, the pattern selector 582 may select the alternative pattern whose ratio is not zero as the instruction in the sequence list 567 for the plural-alternative sequence. In this case, an assembly instruction sequence that is the alternative pattern whose ratio is not zero is selected as the instruction.

Next, the pattern selector 582 may replace the plural-alternative sequence with the selected instruction in the sequence list 567 (Step S736). As described above, the selected instruction may be an assembly instruction sequence, or assembly instruction sequences and their respective ratios. The pattern selector 582 may replace, with an assembly instruction sequence as the instruction sequence, the plural-alternative sequence other than a plural-alternative sequence whose alternative patterns includes two or more alternative patterns with non-zero ratios. The pattern selector 582 may replace, with the alternative patterns and their respective ratios as the instruction sequence, the plural-alternative sequence whose alternative patterns include two or more alternative patterns with non-zero ratios.

When not all the plural-alternative sequences in the intermediate representation are selected (NO in Step S737), the operation of the information processing apparatus 500 returns to the Step S732, and the information processing apparatus 500 repeats the operation from the Step S732.

When all the plural-alternative sequences in the intermediate representation are selected (YES in Step S737), the pattern selector 582 selects assembly instructions based on the mapping from the intermediate instructions to the assembly instructions as an instruction for the selected intermediate instruction in the sequence list 567 for the other intermediate instructions, i.e. intermediate instructions not included in the plural-alternative sequences (Step S738). The pattern selector 582 replaces the other intermediate instructions with the selected instructions, i.e. the selected assembly instructions (Step S739). The information processing apparatus 500 ends the operation of FIG. 7C.

Figure 7D:
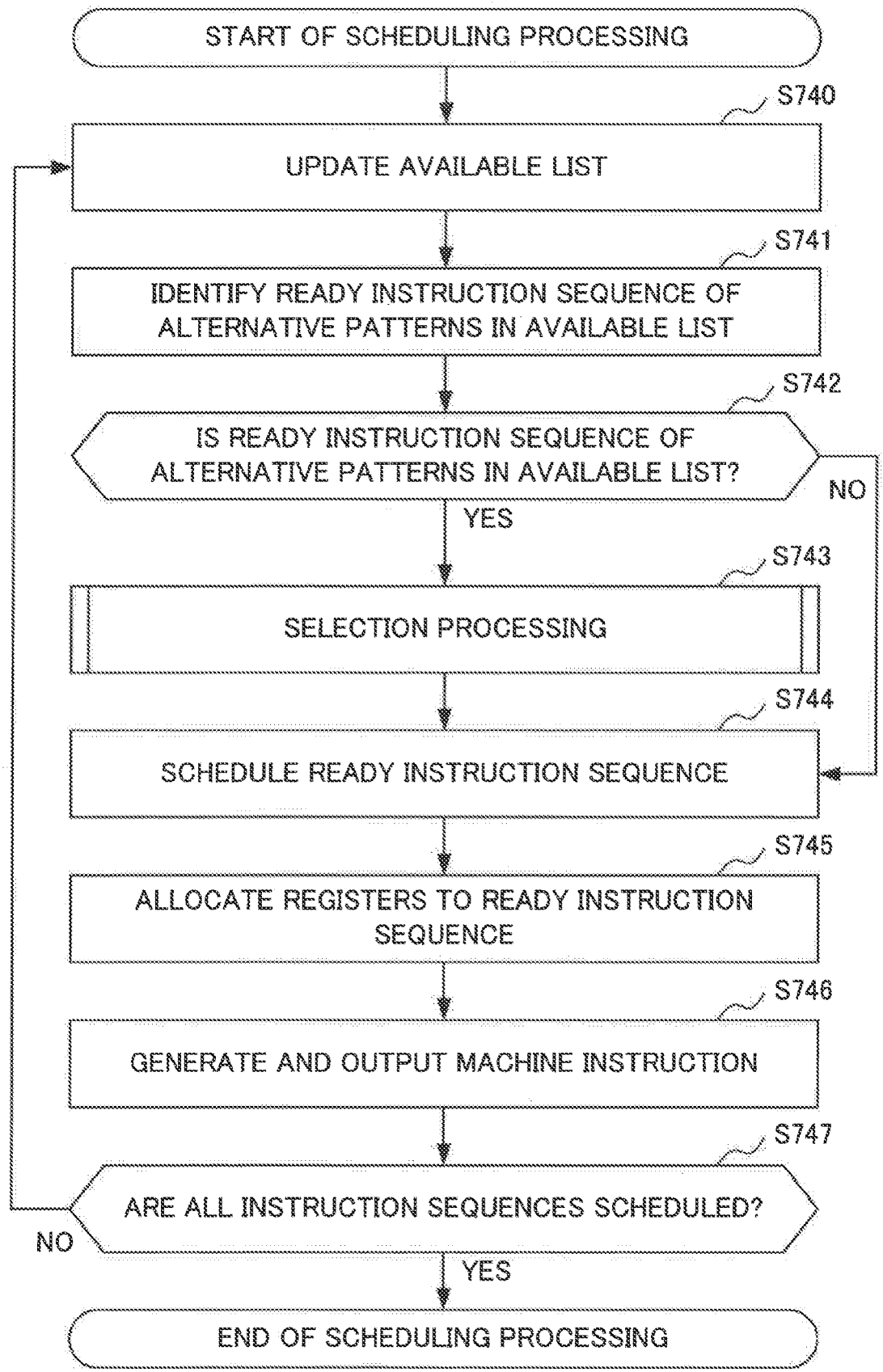
FIG. 7D is a flowchart of an example operation of the scheduling processing of the information processing apparatus according to the second exemplary embodiment of the present disclosure.

FIG. 7D is a flowchart of an example operation of the scheduling processing of the information processing apparatus 500.

The available list generator 564 extracts a ready instruction sequence from the sequence list 567 on the basis of completed machine instructions notified by the processor 590 that executes machine instructions generated from the intermediate representation, and updates the available list 565 including the ready instruction sequence (Step S740). The available list generator 564 may extract a plurality of ready instruction sequences from the sequence list 567.

The instruction scheduler 583 identifies a ready instruction sequence of alternative patterns in the available list 565 (Step S741). The ready instruction sequence of alternative patterns is the alternative patterns selected as an instruction sequence in the sequence list 567 and added to the available list as an instruction sequence ready to be executed.

When no ready instruction sequence of alternative pattern is identified in the available list (NO in Step S742), the instruction scheduler 583 schedules the ready instruction sequence in the available list 565 (Step S744). When two or more ready instruction sequences are included in the available list 565, the instruction scheduler 583 schedules the two or more ready instruction sequences.

When at least a ready instruction sequence of alternative patterns is identified in the available list (YES in Step S742), the information processing apparatus 500 performs selection processing (Step S743). In the selection processing in Step S743, an alternative pattern (i.e. an assembly instruction sequence) is selected for the alternative patterns of the ready instruction sequence of alternative patterns, the ready instruction sequence of alternative patterns is replaced with the selected alternative pattern, and the selected alternative pattern becomes the ready instruction sequence. When two or more ready instruction sequences of alternative patterns are identified, the two or more ready instruction sequences of alternative patterns are replaced with their respective selected alternative pattern in Step S743. The selection processing is described in detail below. Then, the instruction scheduler 583 schedules the ready instruction sequence (Step S744).

Next, the register allocator 584 allocates registers to the ready instruction sequence (Step S745). When two or more ready instruction sequences are scheduled, the register allocator allocates registers to each of the two or more ready instruction sequences. The register allocator 584 generates the machine instruction from the ready instruction sequence, and outputs the machine instruction (Step S746).

When not all the instruction sequences transformed from the optimized intermediate representation are sent to the instruction scheduler 583 as ready instruction sequences and scheduled by the instruction scheduler 583 (NO in Step S747), the operation of the scheduling processing in FIG. 7D returns to the operation in Step S740, and the information processing apparatus 500 repeats the operations from Step S740.

When all the instruction sequences transformed from the optimized intermediate representation are sent to the instruction scheduler 583 as ready instruction sequences and scheduled by the instruction scheduler 583 (YES in Step S747), the information processing apparatus 500 ends the scheduling processing in FIG. 7D.

Figure 7E:
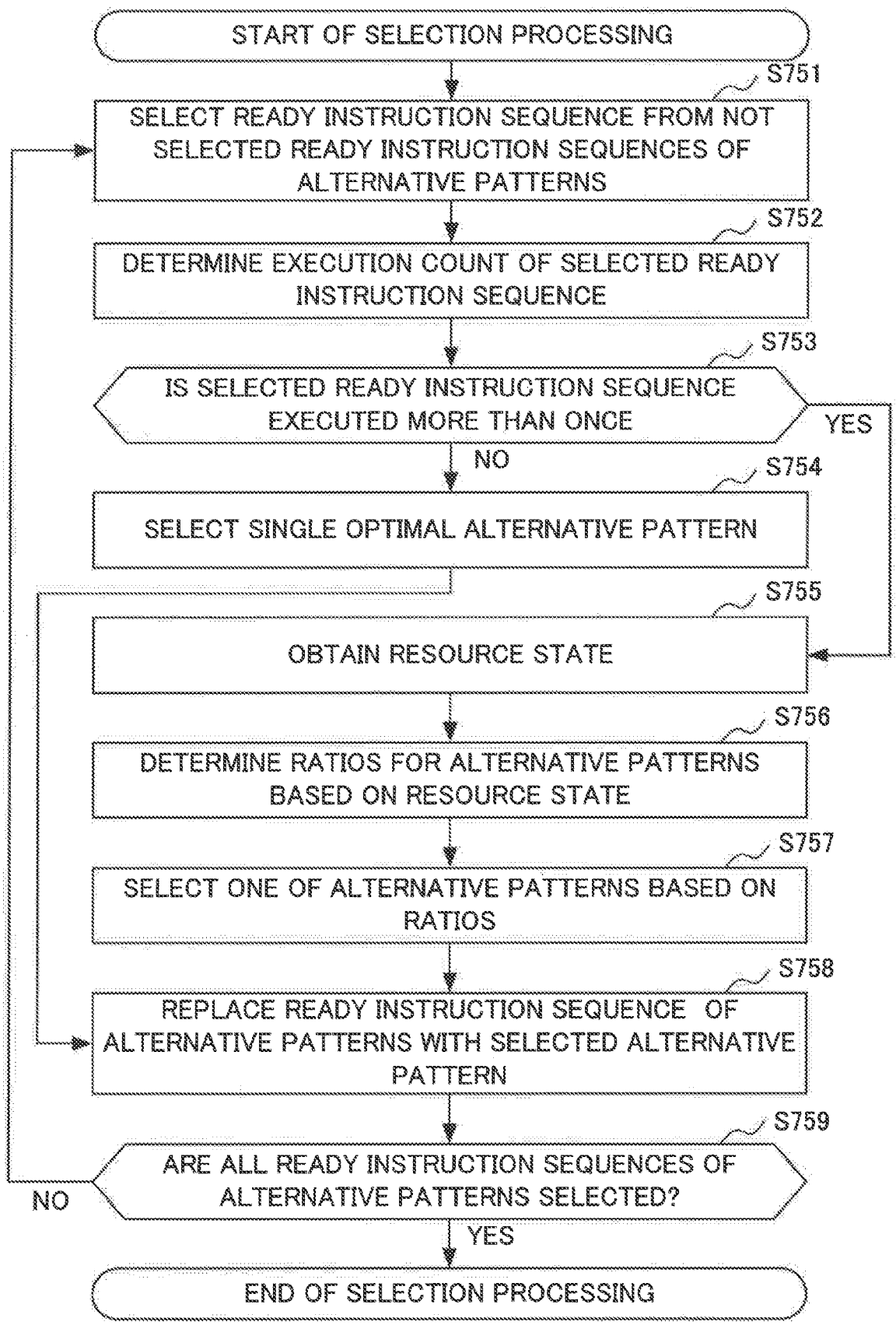
FIG. 7E is a flowchart of an example operation of the selection processing of the information processing apparatus according to the second exemplary embodiment of the present disclosure.

FIG. 7E is a flowchart of an example operation of the selection processing of the information processing apparatus 500. Though two or more ready instruction sequences of alternative patterns are identified at the start of the selection processing in FIG. 7E, one ready instruction sequence of alternative pattern may be identified at the start of the selection processing in FIG. 7E.

The pattern selector 582 receives the ready instruction sequences of alternative patterns from the instruction scheduler 583. The pattern selector 582 selects a ready instruction sequence from not selected ready instruction sequences of alternative patterns among the received ready instruction sequences of alternative patterns (Step S751). Initially, all the received ready instruction sequences of alternative patterns are not selected.

The pattern selector 582 determines an execution count of the selected ready instruction sequence (Step S752). The pattern selector 582 may identify the ready instruction sequences whose alternative patterns include the same set of operator as that of the alternative patterns of the selected ready instruction sequence among the received ready instruction sequences. The pattern selector 582 may determine, as the execution count of the selected ready instruction sequence, the number of the identified ready instruction sequences whose alternative patterns include the same set of operators as that of the alternative patterns of the selected ready instruction sequence. The pattern selector 582 may consider that the identified ready instruction sequences whose alternative patterns include the same set of operators as that of the alternative patterns of the selected ready instruction sequence also as the "selected" ready instruction sequences.

When the selected ready instruction sequence is executed once (NO in Step S753), that is, when the alternative patterns of no other ready instruction sequence in the received ready instruction sequences includes the same set of operators as that of the selected ready instruction sequence, the pattern selector 582 selects one single optimal alternative pattern from the alternative patterns of the selected ready instruction sequence (Step S754). The pattern selector 582 may send information indicating the selected single optimal pattern correlated with the selected ready instruction sequence to the instruction scheduler 583. The pattern selector 582 may send the selected single optimal pattern itself as the information to the instruction scheduler 583.

The instruction scheduler 583 receives the information indicating the selected single optimal pattern correlated with the selected ready instruction sequence. The instruction scheduler 583 replaces the selected ready instruction sequence i.e. a ready instruction sequence of alternative patterns with the selected single optimal pattern (Step S758).

When the selected ready instruction sequence is executed more than once (YES in Step S753), that is, when the alternative patterns of each of one or more other ready instruction sequences in the received ready instruction sequences include the same set of operators as that of the selected ready instruction sequence, the pattern selector 582 may send a request to send the resource state to the resource monitor 570.

The resource monitor 570 obtains a resource state i.e. a state of a resource (Step S755). The resource monitor 570 may send the resource state in response to the request from the pattern selector 582. The pattern selector 582 may receive the resource state from the resource monitor 570.

The pattern selector 582 determines the ratios for the alternative patterns of the selected ready instruction sequence on the basis of the resource state (Step S756). The pattern selector 582 sends the ratios for the alternative patterns to the instruction scheduler 583. The ratios may be correlated with their alternative patterns, and may be further correlated with the selected ready instruction sequence and ready instruction sequences each having the same set of operators in the alternative patterns as that of the selected ready instruction sequence.

The instruction scheduler 583 receives the ratios for the alternative patterns. The instruction scheduler 583 selects an alternative pattern from the alternative patterns of the selected ready instruction sequence on the basis of the ratios (Step S757). The instruction scheduler 583 may select an alternative pattern from the alternative patterns of each of the ready instruction sequences each having the same set of operators in the alternative patterns as that of the selected ready instruction sequence.

The instruction scheduler 583 replaces the selected ready instruction sequence of alternative patterns with the selected alternative pattern (Step S758). The instruction scheduler 583 may replace the ready instruction sequence having the same set of operators in the alternative patterns as that of the selected ready instruction sequence with the alternative pattern selected for the ready instruction sequence for each of the ready instruction sequence having the same set of operators in the alternative patterns as that of the selected ready instruction sequence.

When not all the ready instruction sequences of alternative patterns sent from the instruction scheduler 583 is selected (NO in Step S759), the information processing apparatus 500 repeats the processing from Step S751. When all the ready instruction sequences of alternative patterns sent from the instruction scheduler 583 is selected (YES in Step S759), the information processing apparatus 500 ends the selection processing in FIG. 7E.

The advantageous effect of the present exemplary embodiment is that it is possible to further improve performance of a system including execution units.

The pattern selector 582 determines the ratios for the alternative patterns of the identified plural-alternative sequences on the basis of a resource state of a computer system executing executable instructions transformed from intermediate instruction sequences via the assembly instruction sequences. The resource state may be states of execution units.

The pattern selector may determine to decrease a ratio of assembly instruction sequences to be executed by a busy execution unit and to increase a ratio of assembly instruction sequences to be executed by an idle execution unit. The pattern selector may determine the ratios so that assembly instruction sequences transformed from the identified plural-alternative sequences are not executed by a busy execution unit.

Therefore, according to the present exemplary embodiment, it is not necessary to wait for the busy execution unit to become idle and to execute the assembly instruction sequences to be executed by the busy execution unit. Accordingly, it is possible to further improve performance of the system.

Third Exemplary Embodiment

Next, a third exemplary embodiment of the present disclosure is described in detail with reference to drawings. The third exemplary embodiment is an essential part of the above-described exemplary embodiments.

Figure 8:
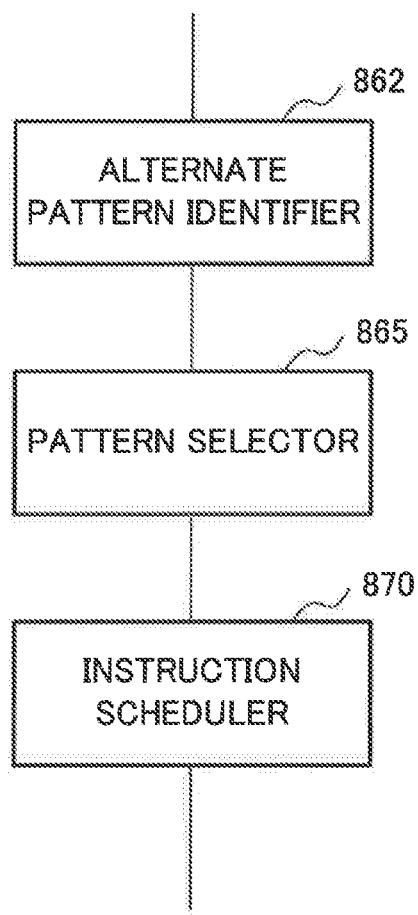
FIG. 8 is a block diagram of an example configuration of an information processing apparatus according to a third exemplary embodiment of the present disclosure.

FIG. 8 is a block diagram of an example configuration of an information processing apparatus 800 according to the present exemplary embodiment.

The information processing apparatus 800 in FIG. 8 includes an alternate pattern identifier 862, a pattern selector 865, and an instruction scheduler 870.

The alternate pattern identifier 862 identifies, in intermediate representation (also referred to as "a program in a first language"), intermediate instruction sequences (also referred to as "first instruction sequences") each of which leads to a result individually achieved by assembly instruction sequences (also referred to as "second instruction sequence") including operators that are common to the first instruction sequence. The assembly instruction sequences are instruction sequences in an assembly language (also referred to as a "second language") that is different from the first language.

In short, the alternate pattern identifier 862 identifies the plural-alternative sequences executed more than once. Each of the identified first instruction sequences is the plural-alternative sequence described above. The second instruction sequences are the alternative patterns.

The pattern selector 865 determines ratios for the second instruction sequences. More specifically, the pattern selector 865 determines the ratios for the operators of the second instruction sequences.

The instruction scheduler 870 selects a second instruction sequence based on the ratios from the second instruction sequences for each of the first instruction sequences.

Next, an example of operation of the information processing apparatus 800 is described with reference to drawings.

FIG. 9 is an example operation of the information processing apparatus 800.

The alternate pattern identifier 862 identifies the plural-alternative sequence executed more than once (Step S910). In other words, the alternate pattern identifier 862 identifies the first instruction sequences in the program in the first language. Each of the first instruction sequences leads to a result individually achieved by the second instruction sequences in the second language different from the first language. The second instruction sequences include the operators which are common to the first instruction sequences.

Next, the pattern selector 865 determines the ratios for the operators of the second instruction sequences (Step S920). The instruction scheduler 870 selects a second instruction sequence based on the ratios from the second instruction sequences for each of the first instruction sequences.

The advantageous effect of the present exemplary embodiment is that it is possible to improve performance of a system including execution units.

The present exemplary embodiment has the same advantageous effect as that of the first exemplary embodiment. The reason for the advantageous effect is the same as that of the first exemplary embodiment.

Other Exemplary Embodiments

Each of the information processing apparatus 200, the information processing apparatus 500 and the information processing apparatus 800 is achieved by a computer such as the computer 100 in FIG. 1, dedicated hardware such as a circuit, or a combination of a computer and dedicated hardware.

The storage medium 174 may store a program that causes the computer to operate as the information processing apparatus 200, the information processing apparatus 500, or the information processing apparatus 800. The processor 110 may read out the program into the memory subsystem 180 (which is referred to also as a "memory") via the storage medium drive 173, the I/O subsystem 160, and the memory bridge 150.

The processor 110 may execute the program which causes the computer 100 to operate as the information processing apparatus 200 and is loaded into the memory subsystem 180. The processor 110 operates as the front end 210, the intermediate code generator 220, the code optimizer 230, and the code generator 240. The processor 110 operates also as the instruction selector 310, the instruction scheduler 320, and the register allocator 330. And the processor 110 operates as the front end 420, the intermediate code generator 430, the code optimizer 440, and the code generator 450. More specifically, the processor 110 operates also as the instruction selector 460, the pattern matcher-generator 461, the alternate pattern identifier 462, the alternate pattern generator 464, and the pattern selector 465.

The processor 110 may execute the program which causes the computer 100 to operate as the information processing apparatus 500 and is loaded into the memory subsystem 180. The processor 110 operates as the front end 520, the intermediate code generator 530, the code optimizer 540, the alternate pattern identifier 550, the alternate pattern generator 561, the available list generator 564, the resource monitor 570, the scheduling criteria module 580, the pattern selector 582, the instruction scheduler 583, and the register allocator 584.

The processor 110 may execute the program which causes the computer 100 to operate as the information processing apparatus 800 and is loaded into the memory subsystem 180. The processor 110 operates as the alternate pattern identifier 862, the pattern selector 865, and the instruction scheduler 870.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 100 computer
110 processor
111 registers
120 cache subsystem
130 GPU subsystem
140 graphics output device
150 memory bridge
160 I/O subsystem
170 input devices
171 mouse
172 keyboard
173 storage medium drive
174 storage medium
180 memory subsystem
181 OS
182 driver
183 application
190 secondary storage
200 information processing apparatus 210 front end
220 intermediate code generator
230 code optimizer
240 code generator
310 instruction selector
320 instruction scheduler
330 register allocator
420 front end
430 intermediate code generator
440 code optimizer
450 code generator
460 instruction selector
461 pattern-matcher generator
462 alternate pattern identifier
463 linked list
464 alternate pattern generator
465 pattern selector
467 sequence list
470 instruction scheduler
480 register allocator
500 information processing apparatus
520 front end
530 intermediate code generator
540 code optimizer
550 alternate pattern identifier
561 alternate pattern generator
564 available list generator
570 resource monitor
580 scheduling criteria module
582 pattern selector
583 instruction scheduler
584 register allocator
590 processor
591 memory

What is claimed is:

1. An information processing apparatus comprising:
a memory that stores a set of instructions; and
at least one processor configured to execute the set of instructions to operate as:
alternate pattern identifier that identifies first instruction sequences in a program in a first language, each of the first instruction sequences leading to a result individually achieved by second instruction sequences in a second language different from the first language, the second instruction sequences including operators being common to the first instruction sequences;
pattern selector that determines ratios for the operators of the second instruction sequences; and
instruction scheduler that selects a second instruction sequence based on the ratios from the second instruction sequences for each of the first instruction sequences.

2. The information processing apparatus according to claim 1, wherein
the at least one processor is further configured to operate as:
monitor that obtains a resource state of a computer system, the resource state being a state of a resource used when the computer system executes third instruction sequences being executable instructions each indicated by the second instruction sequences,
the pattern selector determines the ratios based on the resource state upon obtaining the resource state, and
the instruction scheduler transforms the second instruction sequences into the third instruction sequences, the third instruction sequences provided to the computer system.

3. The information processing apparatus according to claim 2, wherein
the pattern selector determines the ratios for the operators of the second instruction sequences that is ready to be executed.

4. The information processing apparatus according to claim 1, wherein
the operators are correlated with operation units of a processor of the computer system, and
the pattern selector determines the ratio based on performance of the operation units.

5. An information processing method comprising:
identifying first instruction sequences in a program in a first language, each of the first instruction sequences leading to a result individually achieved by second instruction sequences in a second language different from the first language, the second instruction sequences including operators being common to the first instruction sequences;
determining ratios for the operators of the second instruction sequences; and
selecting a second instruction sequence based on the ratios from the second instruction sequences for each of the first instruction sequences.

6. The information processing method according to claim 5, further comprising:
obtaining a resource state of a computer system, the resource state being a state of a resource used when the computer system executes third instruction sequences being executable instructions each indicated by the second instruction sequences; and
transforming the second instruction sequences into the third instruction sequences, the third instruction sequences provided to the computer system, wherein
the determining includes determining the ratios based on the resource state upon obtaining the resource state.

7. The information processing method according to claim 6, wherein
the determining includes determining the ratios for the operators of the second instruction sequences that is ready to be executed.

8. The information processing method according to claim 5, wherein
the operators are correlated with operation units of a processor of the computer system, and
the determining includes determining the ratio based on performance of the operation units.

9. A non-transitory computer readable storage medium storing a program causing a computer to execute:
alternate pattern identifier processing for identifying first instruction sequences in a program in a first language, each of the first instruction sequences leading to a result individually achieved by second instruction sequences in a second language different from the first language, the second instruction sequences including operators being common to the first instruction sequences;
pattern selector processing for determining ratios for the operators of the second instruction sequences; and
instruction scheduler processing for selecting a second instruction sequence based on the ratios from the second instruction sequences for each of the first instruction sequences.

10. The storage medium according to claim 9, wherein
the program causes a computer to further execute:
monitoring processing for obtaining a resource state of a computer system, the resource state being a state of a resource used when the computer system executes third instruction sequences being executable instructions each indicated by the second instruction sequences, the pattern selector processing determines the ratios based on the resource state upon obtaining the resource state, and the instruction scheduler processing transforms the second instruction sequences into the third instruction sequences, the third instruction sequences provided to the computer system.

\* \* \* \* \*